US012376186B2

(12) United States Patent
Wang et al.

(10) Patent No.: US 12,376,186 B2
(45) Date of Patent: Jul. 29, 2025

(54) TECHNIQUES FOR RADIO ACCESS AND SIDELINK DISCONTINUOUS RECEPTION ALIGNMENT

(71) Applicant: QUALCOMM Incorporated, San Diego, CA (US)

(72) Inventors: Kaidong Wang, San Diego, CA (US); Jelena Damnjanovic, Del Mar, CA (US); Tao Luo, San Diego, CA (US); Junyi Li, Fairless Hills, PA (US); Juan Montojo, San Diego, CA (US); Ozcan Ozturk, San Diego, CA (US); Peter Gaal, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 350 days.

(21) Appl. No.: 17/819,173

(22) Filed: Aug. 11, 2022

(65) Prior Publication Data
US 2023/0053975 A1 Feb. 23, 2023

Related U.S. Application Data

(60) Provisional application No. 63/260,262, filed on Aug. 13, 2021, provisional application No. 63/233,118, filed on Aug. 13, 2021.

(51) Int. Cl.
*H04W 76/28* (2018.01)
(52) U.S. Cl.
CPC ................... *H04W 76/28* (2018.02)
(58) Field of Classification Search
CPC ...... H04W 76/28; H04W 92/18; H04W 76/14
See application file for complete search history.

(56) References Cited

U.S. PATENT DOCUMENTS 11,510,278 B2 * 11/2022 Pan ..................... H04W 76/28
11,778,685 B2 * 10/2023 Pan ..................... H04L 1/1819
370/329

(Continued)

FOREIGN PATENT DOCUMENTS

WO 2021147011 A1 7/2021

OTHER PUBLICATIONS

Intel Corporation: "On DRX Wake-Up Time Alignment", 3GPP TSG RAN WG2 Meeting #115-e, R2-2107312, 3rd Generation Partnership Project (3GPP), Mobile Competence Centre, 650, Route Des Lucioles, F-06921 Sophia-Antipolis Cedex, France, vol. RAN WG2, No. Electronic meeting, Online, Aug. 1, 2021, Aug. 6, 2021, 4Pages, XP052034037, The whole document.

(Continued)

*Primary Examiner* — Jay P Patel
(74) *Attorney, Agent, or Firm* — Dalei Dong; Harrity & Harrity, LLP

(57) ABSTRACT

Various aspects of the present disclosure generally relate to wireless communication. In some aspects, a first user equipment (UE) may transmit, to a second UE associated with a sidelink connection with the first UE, assistance information indicating at least part of a first discontinuous reception (DRX) configuration for a radio access link between the first UE and a base station. The UE may receive at least part of a sidelink DRX configuration for the sidelink connection, wherein an on duration of the sidelink DRX configuration is not aligned with an on duration of the first DRX configuration. The UE may transmit information indicating at least part of the sidelink DRX configuration. The UE may receive, from the base station, a second DRX configuration for the radio access link. The UE may communicate in accordance with the sidelink DRX configuration or the second DRX configuration. Numerous other aspects are described.

30 Claims, 18 Drawing Sheets

(56) References Cited

U.S. PATENT DOCUMENTS

| | | | |
|---|---|---|---|
| 11,844,096 B2* | 12/2023 | Lee | H04W 76/28 |
| 11,924,747 B2* | 3/2024 | Kim | H04W 76/34 |
| 2021/0227620 A1 | 7/2021 | Pan et al. | |
| 2021/0227621 A1* | 7/2021 | Pan | H04W 72/0446 |
| 2022/0046522 A1* | 2/2022 | Kim | H04W 52/365 |
| 2023/0018928 A1* | 1/2023 | Luo | H04W 52/0219 |
| 2023/0059876 A1* | 2/2023 | Pan | H04L 5/0055 |
| 2023/0062804 A1* | 3/2023 | Selvanesan | H04W 76/14 |
| 2023/0064488 A1* | 3/2023 | Han | H04W 76/28 |
| 2023/0098631 A1* | 3/2023 | Lee | H04W 72/56 |
| | | | 370/329 |
| 2023/0292098 A1* | 9/2023 | Ganesan | H04W 84/047 |
| 2023/0292395 A1* | 9/2023 | Han | H04W 76/14 |
| 2023/0300752 A1* | 9/2023 | Li | H04W 76/27 |
| | | | 370/310 |
| 2023/0337221 A1* | 10/2023 | Ding | H04W 72/25 |
| 2024/0172255 A1* | 5/2024 | Luo | H04W 8/005 |
| 2024/0237139 A1* | 7/2024 | Jeong | H04W 24/10 |
| 2024/0373505 A1* | 11/2024 | Ashraf | H04W 72/0446 |

OTHER PUBLICATIONS

International Search Report and Written Opinion—PCT/US2022/074890—ISA/EPO—Nov. 23, 2022.

Oppo: "Left Issues on SL-DRX", 3GPP TSG-RAN WG2 #115-e, R2-2108830, 3rd Generation Partnership Project (3GPP), Mobile Competence Centre, 650, Route Des Lucioles, F-06921 Sophia-Antipolis Cedex, France, vol. RAN WG2, No. E-meeting, Aug. 1, 2021, Aug. 11, 2021, pp. 1-13, XP052042926, Paragraph [0005], Figure 4.

* cited by examiner

TECHNIQUES FOR RADIO ACCESS AND SIDELINK DISCONTINUOUS RECEPTION ALIGNMENT

CROSS-REFERENCE TO RELATED APPLICATIONS

This patent application claims priority to U.S. Provisional Patent Application No. 63/260,262, filed on Aug. 13, 2021, entitled "TECHNIQUES FOR RADIO ACCESS AND SIDELINK DISCONTINUOUS RECEPTION ALIGNMENT," and to U.S. Provisional Patent Application No. 63/233,118, filed on Aug. 13, 2021, entitled "DISCONTINUOUS RECEPTION TIMING ALIGNMENT FOR SIDELINK AND CELLULAR COMMUNICATION," both assigned to the assignee hereof. The disclosures of the prior applications are considered part of and is incorporated by reference into this patent application.

FIELD OF THE DISCLOSURE

Aspects of the present disclosure generally relate to wireless communication and to techniques and apparatuses for radio access and sidelink discontinuous reception (DRX) alignment.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a first user equipment (UE). The method may include receiving, from a network node, a first discontinuous reception (DRX) configuration for a radio access link between the first UE and the network node. The method may include receiving, from the second UE, at least part of a sidelink DRX configuration for the sidelink connection. The method may include transmitting, to the network node, information indicating at least part of the sidelink DRX configuration. The method may include communicating in accordance with the sidelink DRX configuration or the first DRX configuration.

Some aspects described herein relate to a first user equipment (UE) for wireless communication. The first UE may include a memory and one or more processors coupled to the memory. The one or more processors may be configured to receive, from a network node, a first discontinuous reception (DRX) configuration for a radio access link between the first UE and the network node. The one or more processors may be configured to receive, from the second UE, at least part of a sidelink DRX configuration for the sidelink connection. The one or more processors may be configured to transmit, to the network node, information indicating at least part of the sidelink DRX configuration. The one or more processors may be configured to communicate in accordance with the sidelink DRX configuration or the first DRX configuration.

Some aspects described herein relate to a non-transitory computer-readable medium that stores a set of instructions for wireless communication by a first user equipment (UE). The set of instructions, when executed by one or more processors of the first UE, may cause the first UE to receive, from a network node, a first discontinuous reception (DRX) configuration for a radio access link between the first UE and the network node. The set of instructions, when executed by one or more processors of the first UE, may cause the first UE to receive, from the second UE, at least part of a sidelink DRX configuration for the sidelink connection. The set of instructions, when executed by one or more processors of the first UE, may cause the first UE to transmit, to the network node, information indicating at least part of the sidelink DRX configuration. The set of instructions, when executed by one or more processors of the first UE, may cause the first UE to communicate in accordance with the sidelink DRX configuration or the first DRX configuration.

Some aspects described herein relate to an apparatus for wireless communication. The apparatus may include means for receiving, from a network node, a first discontinuous reception (DRX) configuration for a radio access link between the apparatus and the network node. The apparatus may include means for receiving, from the second UE, at least part of a sidelink DRX configuration for the sidelink connection. The apparatus may include means for transmitting, to the network node, information indicating at least part of the sidelink DRX configuration. The apparatus may include means for communicating in accordance with the sidelink DRX configuration or the first DRX configuration.

A method of wireless communication performed by a first user equipment (UE) may include transmitting, to a second UE associated with a sidelink connection with the first UE, assistance information indicating at least part of a first discontinuous reception (DRX) configuration for a radio access link between the first UE and a base station; receiving, from the second UE, at least part of a sidelink DRX configuration for the sidelink connection, wherein an on duration of the sidelink DRX configuration is not aligned with an on duration of the first DRX configuration; transmitting, to the base station, information indicating at least part of the sidelink DRX configuration; receiving, from the base station, a second DRX configuration for the radio access link; and communicating in accordance with the sidelink DRX configuration or the second DRX configuration.

A method of wireless communication performed by a base station may include transmitting, to a first UE, information indicating a first DRX configuration for a radio access link between the first UE and the base station; receiving, from the first UE, information indicating at least part of a sidelink DRX configuration between the first UE and a second UE, wherein an on duration of the sidelink DRX configuration is not aligned with an on duration of the first DRX configuration; identifying a second DRX configuration for the radio access link, wherein an on duration of the second DRX configuration is aligned with an on duration of the sidelink DRX configuration; and transmitting, to the first UE, information indicating the second DRX configuration.

An apparatus for wireless communication at a first UE may include a memory, and one or more processors, coupled to the memory, configured to transmit, to a second UE associated with a sidelink connection with the first UE, assistance information indicating at least part of a first discontinuous reception (DRX) configuration for a radio access link between the first UE and a base station; receive, from the second UE, at least part of a sidelink DRX configuration for the sidelink connection, wherein an on duration of the sidelink DRX configuration is not aligned with an on duration of the first DRX configuration; transmit, to the base station, information indicating at least part of the sidelink DRX configuration; receive, from the base station, a second DRX configuration for the radio access link; and communicate in accordance with the sidelink DRX configuration or the second DRX configuration.

An apparatus for wireless communication at a base station may include a memory, and one or more processors, coupled to the memory, configured to transmit, to a first UE, information indicating a first DRX configuration for a radio access link between the first UE and the base station; receive, from the first UE, information indicating at least part of a sidelink DRX configuration between the first UE and a second UE, wherein an on duration of the sidelink DRX configuration is not aligned with an on duration of the first DRX configuration; identify a second DRX configuration for the radio access link, wherein an on duration of the second DRX configuration is aligned with an on duration of the sidelink DRX configuration; and transmit, to the first UE, information indicating the second DRX configuration.

A non-transitory computer-readable medium may store a set of instructions for wireless communication, the set of instructions comprising: one or more instructions that, when executed by one or more processors of a first UE, cause the first UE to: transmit, to a second UE associated with a sidelink connection with the first UE, assistance information indicating at least part of a first DRX configuration for a radio access link between the first UE and a base station; receive, from the second UE, at least part of a sidelink DRX configuration for the sidelink connection, wherein an on duration of the sidelink DRX configuration is not aligned with an on duration of the first DRX configuration; transmit, to the base station, information indicating at least part of the sidelink DRX configuration; receive, from the base station, a second DRX configuration for the radio access link; and communicate in accordance with the sidelink DRX configuration or the second DRX configuration.

A non-transitory computer-readable medium may store a set of instructions for wireless communication, the set of instructions comprising one or more instructions that, when executed by one or more processors of a base station, cause the base station to: transmit, to a first UE, information indicating a first DRX configuration for a radio access link between the first UE and the base station; receive, from the first UE, information indicating at least part of a sidelink DRX configuration between the first UE and a second UE, wherein an on duration of the sidelink DRX configuration is not aligned with an on duration of the first DRX configuration; identify a second DRX configuration for the radio access link, wherein an on duration of the second DRX configuration is aligned with an on duration of the sidelink DRX configuration; and transmit, to the first UE, information indicating the second DRX configuration.

An apparatus for wireless communication may include means for transmitting, to a UE associated with a sidelink connection with the apparatus, assistance information indicating at least part of a first DRX configuration for a radio access link between the first UE and a base station; means for receiving, from the second UE, at least part of a sidelink DRX configuration for the sidelink connection, wherein an on duration of the sidelink DRX configuration is not aligned with an on duration of the first DRX configuration; means for transmitting, to the base station, information indicating at least part of the sidelink DRX configuration; means for receiving, from the base station, a second DRX configuration for the radio access link; and means for communicating in accordance with the sidelink DRX configuration or the second DRX configuration.

An apparatus for wireless communication may include means for transmitting, to a first UE, information indicating a first DRX configuration for a radio access link between the first UE and the base station; means for receiving, from the first UE, information indicating at least part of a sidelink DRX configuration between the first UE and a second UE, wherein an on duration of the sidelink DRX configuration is not aligned with an on duration of the first DRX configuration; means for identifying a second DRX configuration for the radio access link, wherein an on duration of the second DRX configuration is aligned with an on duration of the sidelink DRX configuration; and means for transmitting, to the first UE, information indicating the second DRX configuration.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
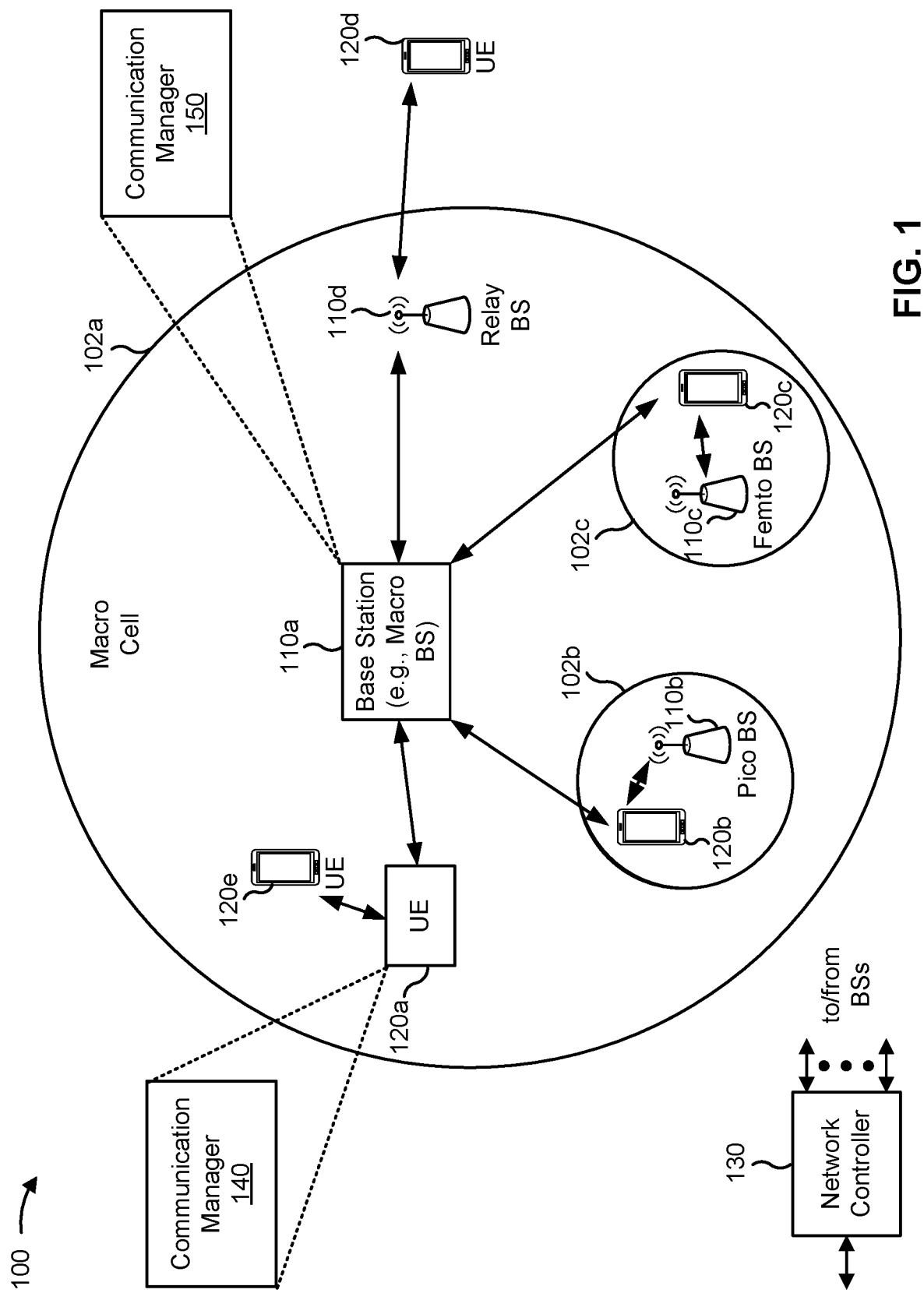
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110*a*, a BS 110*b*, a BS 110*c*, and a BS 110*d*), a user equipment (UE) 120 or multiple UEs 120 (shown as a UE 120*a*, a UE 120*b*, a UE 120*c*, a UE 120*d*, and a UE 120*e*), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110*a* may be a macro base station for a macro cell 102*a*, the BS 110*b* may be a pico base station for a pico cell 102*b*, and the BS 110*c* may be a femto base station for a femto cell 102*c*. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110*d* (e.g., a relay base station) may communicate with the BS 110*a* (e.g., a macro base station) and the UE 120*d* in order to facilitate communication between the BS 110*a* and the UE 120*d*. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit, to a second UE associated with a sidelink connection with the first UE, assistance information indicating at least part of a first discontinuous reception (DRX) configuration for a radio access link between the first UE and a base station; receive, from the second UE, at least part of a sidelink DRX configuration for the sidelink connection, wherein an on duration of the sidelink DRX configuration is not aligned with an on duration of the first DRX configuration; transmit, to the base station, information indicating at least part of the sidelink DRX configuration; receive, from the base station, a second DRX configuration for the radio access link; and communicate in accordance with the sidelink DRX configuration or the second DRX configuration. Additionally, or alternatively, the communication manager 140 may perform one or more other operations described herein.

In some aspects, the base station 110 (e.g., a network node) may include a communication manager 150. As described in more detail elsewhere herein, the communication manager 150 may transmit, to a first user equipment (UE), information indicating a first discontinuous reception (DRX) configuration for a radio access link between the first UE and the base station; receive, from the first UE, information indicating at least part of a sidelink DRX configuration between the first UE and a second UE, wherein an on duration of the sidelink DRX configuration is not aligned with an on duration of the first DRX configuration; identify a second DRX configuration for the radio access link, wherein an on duration of the second DRX configuration is aligned with an on duration of the sidelink DRX configuration; and transmit, to the first UE, information indicating the second DRX configuration. Additionally, or alternatively, the communication manager 150 may perform one or more other operations described herein.

As indicated above, FIG. 1 is provided as an example. Other examples may differ from what is described with regard to FIG. 1.

Deployment of communication systems, such as 5G New Radio (NR) systems, may be arranged in multiple manners with various components or constituent parts. In a 5G NR system, or network, a network node, a network entity, a mobility element of a network, a radio access network (RAN) node, a core network node, a network element, a base station, or a network equipment may be implemented in an aggregated or disaggregated architecture. For example, a base station (such as a NB, eNB, NR base station (BS), 5G NB, gNB, access point (AP), transmit receive point (TRP), or cell), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more central units (CUs), one or more distributed units (DUs), one or more radio units (RUs), or a combination thereof).

An aggregated base station may be configured to utilize a radio protocol stack that is physically or logically integrated within a single RAN node (for example, within a single device or unit). A disaggregated base station may be configured to utilize a protocol stack that is physically or logically distributed among two or more units (such as one or more CUs, one or more DUs, or one or more RUs). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also may be implemented as virtual units (e.g., a virtual central unit (VCU), a virtual distributed unit (VDU), or a virtual radio unit (VRU)).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that may be individually deployed. A disaggregated base station may include functionality implemented across two or more units at various physical locations, as well as functionality implemented for at least one unit virtually, which may enable flexibility in network design. The various units of the disaggregated base station may be configured for wired or wireless communication with at least one other unit of the disaggregated base station.

Figure 2:
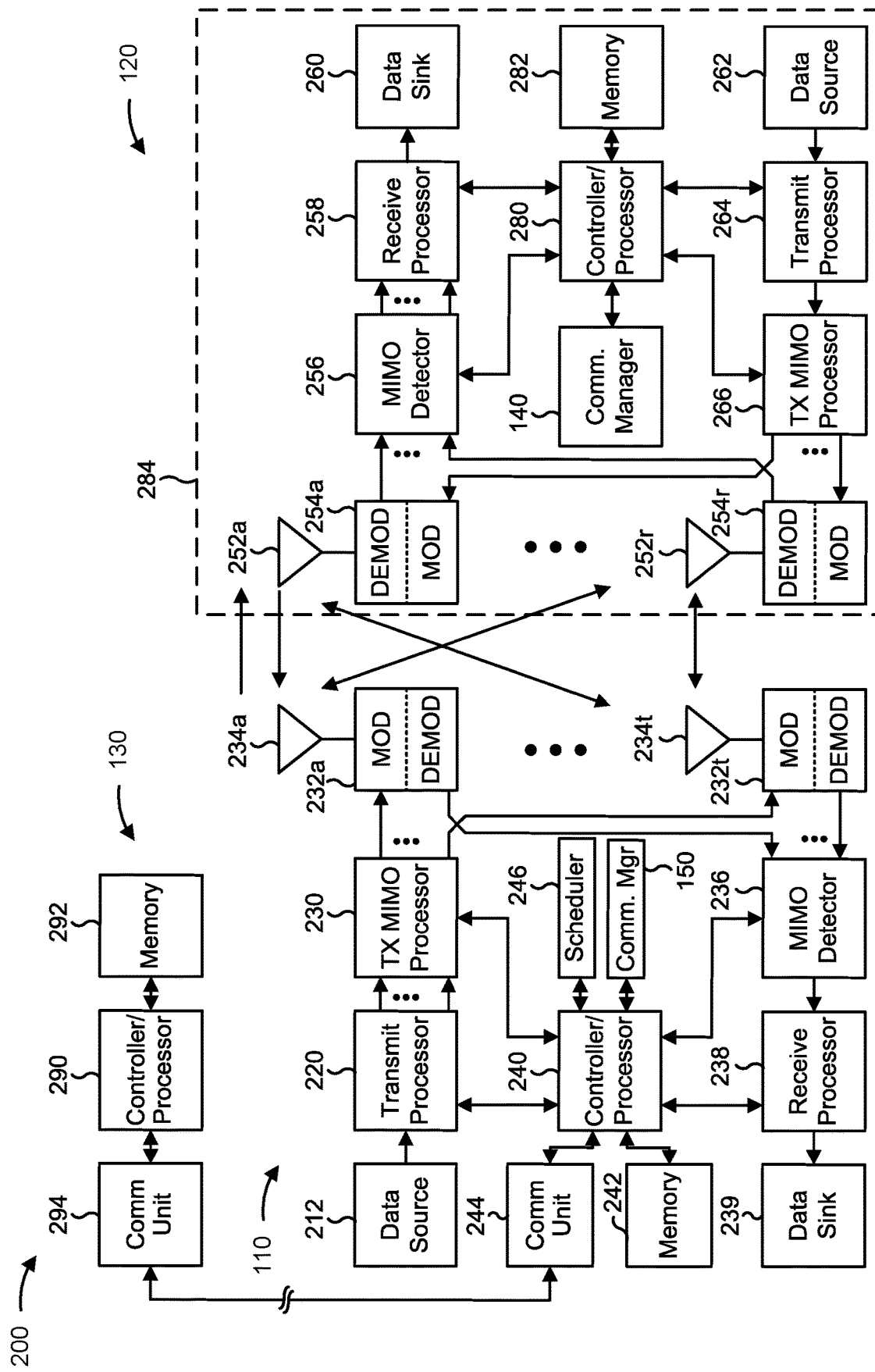
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-12).

The controller/processor 240 of the base station 110, the controller/processor 280 of the UE 120, and/or any other component(s) of FIG. 2 may perform one or more techniques associated with sidelink and radio access DRX configuration alignment, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, a first UE (e.g., UE 120, UE 305, UE 405, UE 410, the receiver UE of FIG. 7) includes means for transmitting, to a second UE associated with a sidelink connection with the first UE, assistance information indicating at least part of a first discontinuous reception (DRX) configuration for a radio access link between the first UE and a base station; means for receiving, from the second UE, at least part of a sidelink DRX configuration for the sidelink connection, wherein an on duration of the sidelink DRX configuration is not aligned with an on duration of the first DRX configuration; means for transmitting, to the base station, information indicating at least part of the sidelink DRX configuration; means for receiving, from the base station, a second DRX configuration for the radio access link; and/or means for communicating in accordance with the sidelink DRX configuration or the second DRX configuration. The means for the first user equipment (UE) to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a base station (e.g., BS 110, the first base station of FIG. 7) includes means for transmitting, to a first user equipment (UE), information indicating a first discontinuous reception (DRX) configuration for a radio access link between the first UE and the base station; means for receiving, from the first UE, information indicating at least part of a sidelink DRX configuration between the first UE and a second UE, wherein an on duration of the sidelink DRX configuration is not aligned with an on duration of the first DRX configuration; means for identifying a second DRX configuration for the radio access link, wherein an on duration of the second DRX configuration is aligned with an on duration of the sidelink DRX configuration; and/or means for transmitting, to the first UE, information indicating the second DRX configuration. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
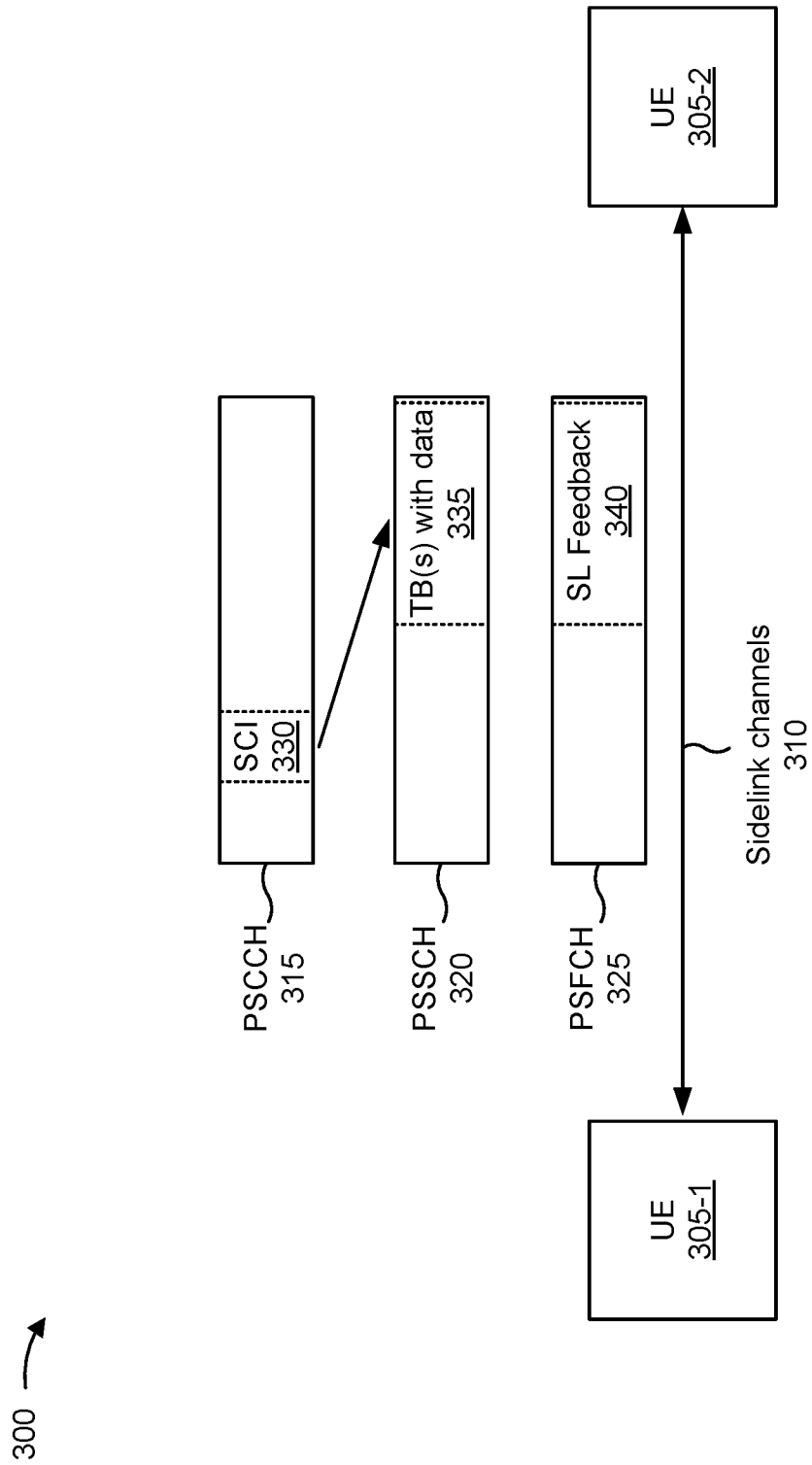
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or V2P communications) and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. For example, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

Although shown on the PSCCH 315, in some aspects, the SCI 330 may include multiple communications in different stages, such as a first stage SCI (SCI-1) and a second stage SCI (SCI-2). The SCI-1 may be transmitted on the PSCCH 315. The SCI-2 may be transmitted on the PSSCH 320. The SCI-1 may include, for example, an indication of one or more resources (e.g., time resources, frequency resources, and/or spatial resources) on the PSSCH 320, information for decoding sidelink communications on the PSSCH, a quality of service (QoS) priority value, a resource reservation period, a PSSCH demodulation reference signal (DMRS) pattern, an SCI format for the SCI-2, a beta offset for the SCI-2, a quantity of PSSCH DMRS ports, and/or a modulation and coding scheme (MCS). The SCI-2 may include information associated with data transmissions on the PSSCH 320, such as a hybrid automatic repeat request (HARQ) process ID, a new data indicator (NDI), a source identifier, a destination identifier, and/or a channel state information (CSI) report trigger.

In some aspects, the one or more sidelink channels 310 may use resource pools. For example, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. For example, the UE 305 may measure a received signal strength indicator (RSSI) parameter (e.g., a sidelink-RSSI (S-RSSI) parameter) associated with various sidelink channels, may measure a reference signal received power (RSRP) parameter (e.g., a PSSCH-RSRP parameter) associated with various sidelink channels, and/or may measure a reference signal received quality (RSRQ) parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources and/or channel parameters. Additionally, or alternatively, the UE 305 may perform resource selection and/or scheduling by determining a channel busy rate (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate, for example, one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or a modulation and coding scheme (MCS) to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

In some aspects, the UEs 305 may communicate with each other using a sidelink discontinuous reception (DRX) configuration. In a sidelink DRX configuration, a receiver UE (e.g., UE 305) stays in an idle mode while monitoring for messages from a transmitter UE (e.g., UE 305), which avoids the receiver UE having to monitor all opportunities for transmission or reception of data and helps conserve battery power. The techniques described herein enable alignment of a sidelink DRX configuration with a radio access (e.g., Uu link) DRX configuration between the receiver UE and a base station.

As indicated above, FIG. 3 is provided as an example. Other examples may differ from what is described with respect to FIG. 3.

Figure 4:
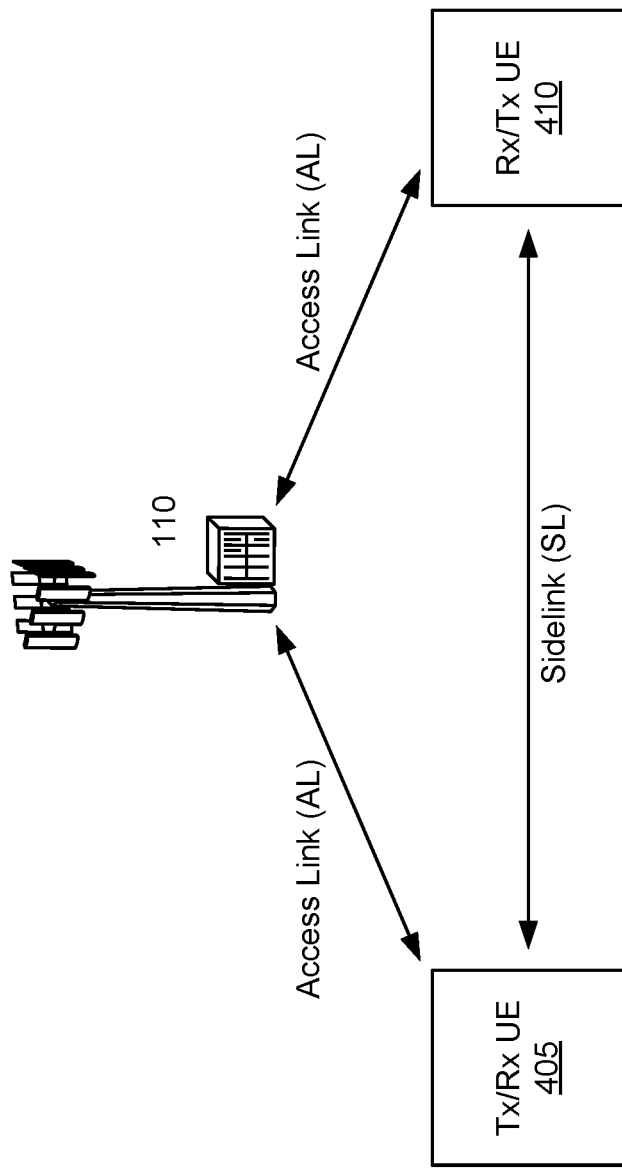
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first radio access link. Additionally, or alternatively, in some sidelink modes, the base station 110 may communicate with the Rx/Tx UE 410 via a second radio access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as a radio access link. Sidelink communications may be transmitted via the sidelink, and radio access link communications may be transmitted via the radio access link. A radio access link communication may be either a downlink communication (from a base station 110 to a UE 120) or an uplink communication (from a UE 120 to a base station 110).

A UE (e.g., UE 410) and a base station (e.g., base station 110) may be associated with a DRX configuration such as a connected mode DRX (CDRX) configuration. A DRX configuration between a UE and a base station may be referred to herein as an access link DRX configuration, a first DRX configuration, or a second DRX configuration. In the DRX configuration, the UE may be permitted to enter a "sleep" state in which the UE is not required to monitor a physical downlink control channel. The UE may periodically wake to monitor the PDCCH in case the base station needs to schedule a downlink transmission via the PDCCH. Furthermore, as mentioned above, two UEs (e.g., UEs 405 and 410) may be associated with a sidelink DRX configuration, which may allow a receiver UE to enter into a sleep state in which the receiver UE is not required to monitor for data transmission or reception with regard to a transmitter UE. If a radio access DRX configuration of a UE and a sidelink DRX configuration of the UE are not aligned with each other, the UE may have to wake on frequent occasions, as described in more detail below, which consumes significant battery power of the UE. The techniques described herein provide signaling and messaging structures for the exchange of information associated with aligning a radio access DRX configuration and a sidelink DRX configuration, such that the UE wakes for fewer on durations, thereby conserving battery power of the UE.

As indicated above, FIG. 4 is provided as an example. Other examples may differ from what is described with respect to FIG. 4.

Figure 5:
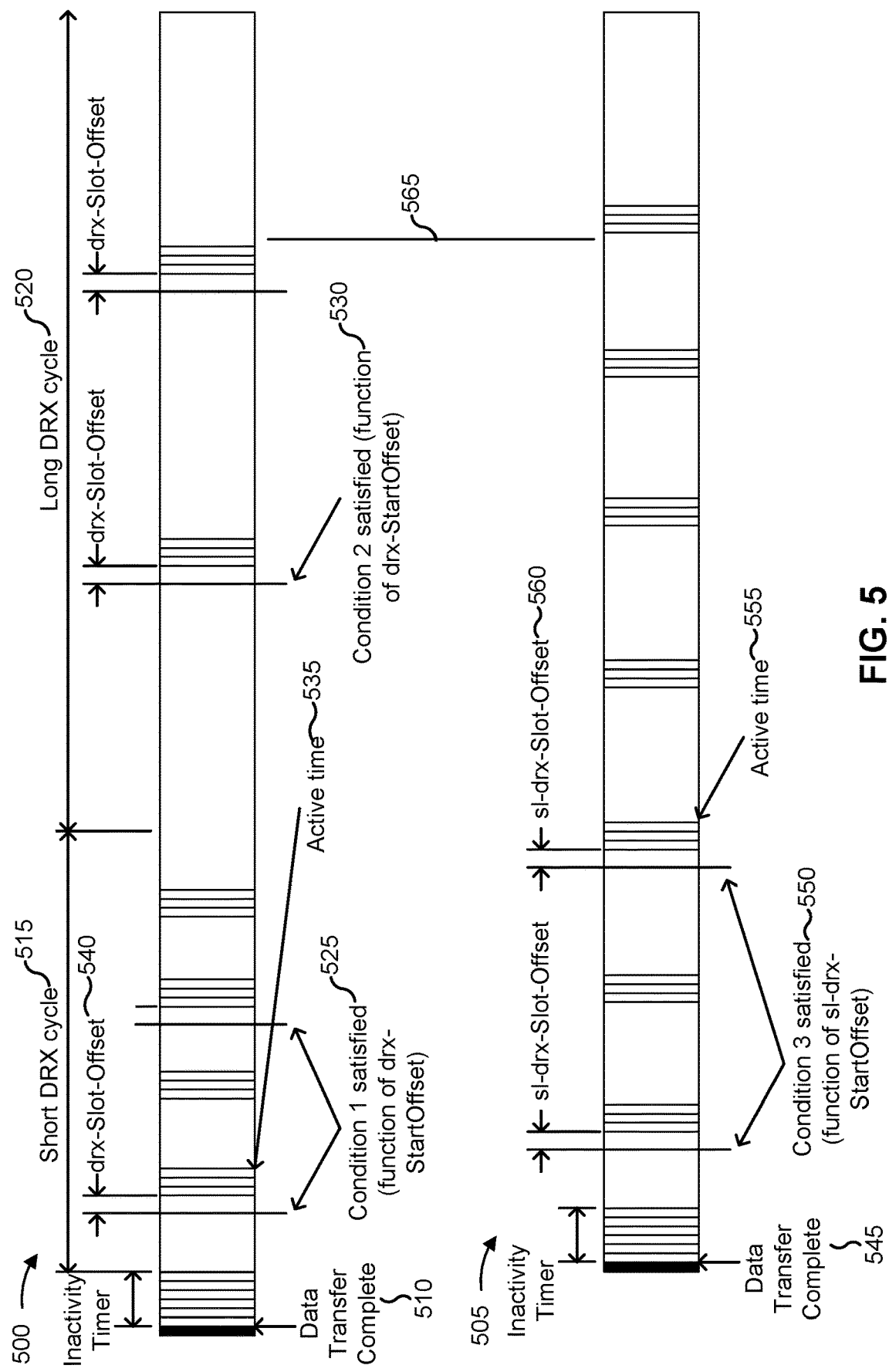
FIG. 5 is a diagram illustrating examples of a radio access discontinuous reception (DRX) configuration and a sidelink DRX configuration, in accordance with the present disclosure.
Figure 6:
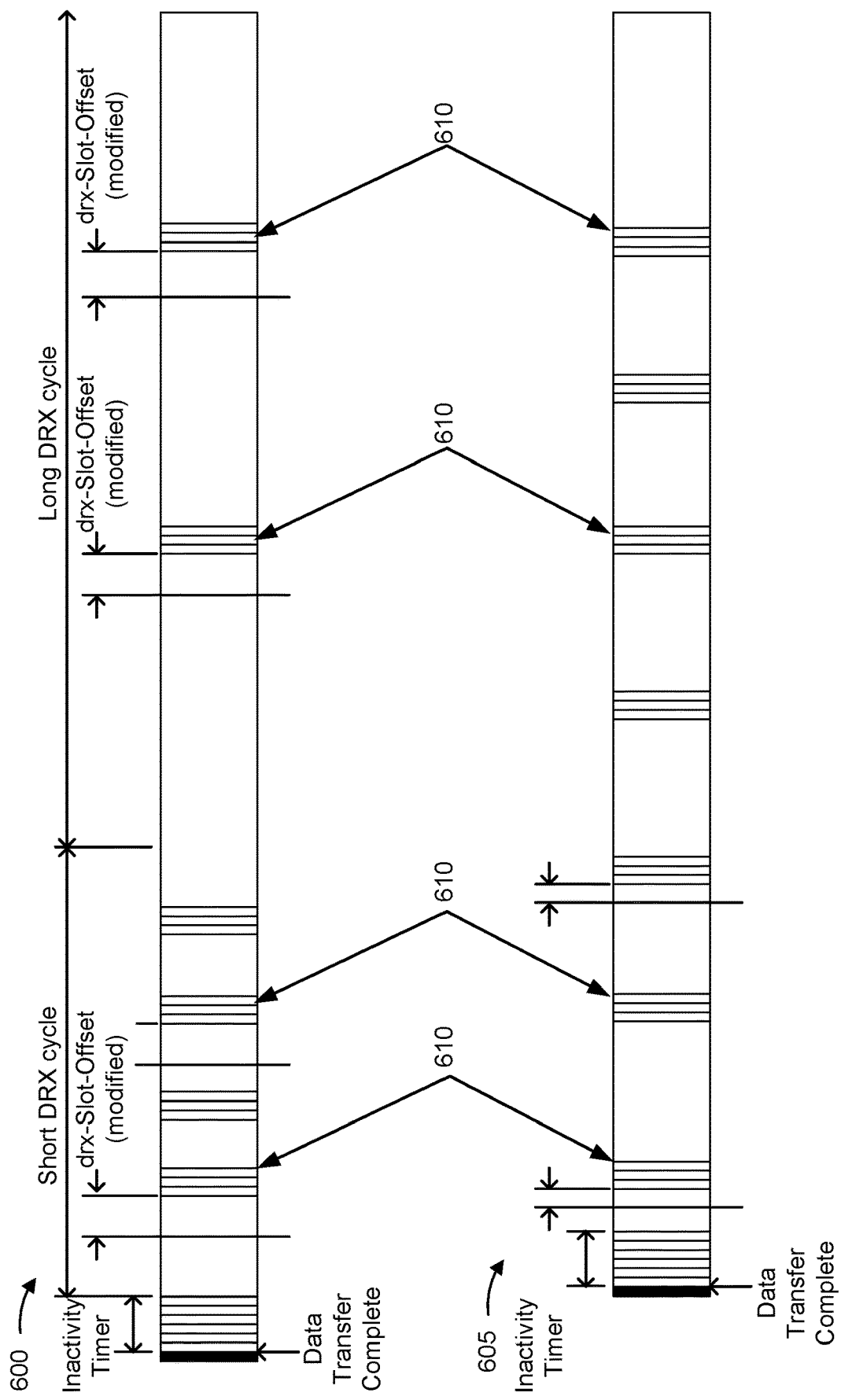
FIG. 6 is a diagram illustrating examples of a modified radio access DRX configuration and a sidelink DRX configuration, in accordance with the present disclosure.

FIG. 5 is a diagram illustrating examples 500 and 505 of a radio access DRX configuration and a sidelink DRX configuration, in accordance with the present disclosure. FIG. 6 is a diagram illustrating examples 600 and 605 of a modified radio access DRX configuration and a sidelink DRX configuration, in accordance with the present disclosure. In example 600, the modified radio access DRX configuration is modified such that at least some active times (e.g., on durations) of the two DRX cycles align with each other.

Example 500 shows a radio access DRX configuration between a UE (e.g., UE 120, UE 305, UE 405, UE 410) and a base station (e.g., base station 110). The radio access DRX configuration may be a CDRX configuration. For example, the UE and the base station may have a radio resource control (RRC) connection, and the UE may be in RRC connected mode. A CDRX configuration may help the UE save power. As used herein, "DRX configuration" can refer to the information defining a DRX cycle, and to the DRX cycle itself.

In example 500, a data transfer 510 is completed. For example, the data transfer 510 may be a PDCCH or a PDSCH. After the data transfer 510 is complete, an inactivity timer (such as may be defined by a parameter drx-InactivityTimer) is started. The inactivity timer expires, and the UE enters a sleep state, at the start of a short DRX cycle 515. Short DRX cycles are optional, and can be configured by including a shortDRX parameter within the radio access DRX configuration. If the shortDRX parameter is not included, the UE may use only a long DRX cycle 520.

As shown by reference number 525, in a short DRX cycle, a first condition (Condition 1) may be satisfied. Condition 1 defines how to identify a subframe in which an active time should start (subject to a DRX slot offset, as described below). Condition 1 may be a function of a DRX start offset (such as may be defined by a parameter drx-StartOffset). For example, Condition 1 may be defined as follows:

[(SFN×10)+subframe number]modulo(drx-Short-Cycle)=(drx-StartOffset)modulo(drx-Short-Cycle), where "SFN" is a system frame number.    Condition 1:

As shown by reference number 530, in a long DRX cycle, a second condition (Condition 2) may be satisfied. Condition 2 defines how to identify a subframe in which an active time should start (subject to a DRX slot offset, as described below). Condition 2 may be a function of a DRX start offset (such as may be defined by a parameter drx-StartOffset). For example, Condition 2 may be defined as follows:

[(SFN×10)+subframe number]modulo(drx-Long-Cycle)=(drx-StartOffset).    Condition 2:

As shown, an active time 535 may start after a DRX slot offset 540 relative to a start of a subframe that satisfies the first condition or the second condition. In some aspects, the first condition or the second condition may be referred to as a triggering condition. The DRX slot offset defines the start of the active time (sometimes referred to as a DRX active period) relative to the start of the subframe that satisfies the triggering condition. The length of the active time may be defined by a parameter drx-onDurationTimer (not shown).

Example 505 shows a sidelink DRX configuration between a transmitter UE (e.g., UE 120, UE 305, UE 405) and the UE of example 500, which may be referred to as a receiver UE. The sidelink DRX configuration may be configured by one or more of the transmitter UE, the receiver UE, a base station associated with the transmitter UE, or a base station associated with the receiver UE. For example, the transmitter UE and the receiver UE may have a sidelink connection, and the UE may be in a connected mode. In some aspects, a sidelink DR In example 505, a data transfer 545 is completed. For example, the data transfer 545 may be a PSCCH, a PSSCH, or a PSFCH. After the data transfer 545 is complete, an inactivity timer (such as may be defined by a parameter drx-InactivityTimer) is started. The inactivity timer expires and the UE enters a sleep state.

As shown by reference number 550, a third condition (Condition 3) may be satisfied. Condition 3 defines how to identify a subframe in which an active time should start (subject to a sidelink DRX slot offset, as described below). Condition 3 may be a function of a sidelink DRX start offset (such as may be defined by a parameter sl-drx-StartOffset). For example, Condition 3 may be defined as follows:

[(SFN×10)+subframe number]modulo(sl-drx-Cycle)=(sl-drx-StartOffset).    Condition 3:

As shown, an active time 555 may start after a sidelink DRX slot offset 560 relative to a start of a subframe that satisfies the third condition. In some aspects, the third condition may be referred to as a triggering condition. The DRX slot offset defines the start of the active time (sometimes referred to as a DRX active period) relative to the start of the subframe that satisfies the triggering condition. The length of the active time may be defined by a parameter drx-onDurationTimer (not shown).

An active time is a time in which a UE is monitoring for a communication, such as a PDCCH or a sidelink communication. For example, a UE may enter an active time while a timer defined by drx-onDurationTimer is running. Thus, during an on duration, the UE may be in an active time.

In FIG. 5, many of the on durations (e.g., the active times) of the radio access DRX configuration of example 500, and the active times of the sidelink DRX configuration of example 500, are not aligned with each other in time (as represented by the active times' horizontal displacement relative to each other). As just one example, reference number 565 shows how two active times are not aligned with each other. As used herein, a first active time and a second active time may be aligned in time if the first active time and the second active time at least partially overlap each other in time. If the UE of examples 500 and 505 has to enter an active time for each of the on durations of examples 500 and 505, then much of the power savings of the radio access DRX configuration and the sidelink DRX configuration may be frustrated, thereby increasing power consumption of the UE.

Some techniques and apparatuses described herein enable alignment of a radio access DRX configuration and a sidelink DRX configuration. For example, some techniques and apparatuses described herein provide signaling between the UE of example 500/505, a transmitter UE, the base station of example 500, and/or a base station associated with the transmitter UE to identify a radio access DRX configuration and a sidelink DRX configuration, and to support the alignment of the radio access DRX configuration with the sidelink DRX configuration. As an example, refer to FIG. 6. In FIG. 6, the radio access DRX configuration 600 has been modified so that active times (e.g., on durations) of the radio access DRX configuration 600 align with active times of the sidelink DRX configuration 605. For example, a DRX slot offset of the radio access DRX configuration 600 has been modified so that the on durations shown by reference number 610 are aligned. Thus, the number of times that the UE must enter an active time may be reduced (in FIG. 6, by 4 times), thereby reducing power consumption.

Figure 7:
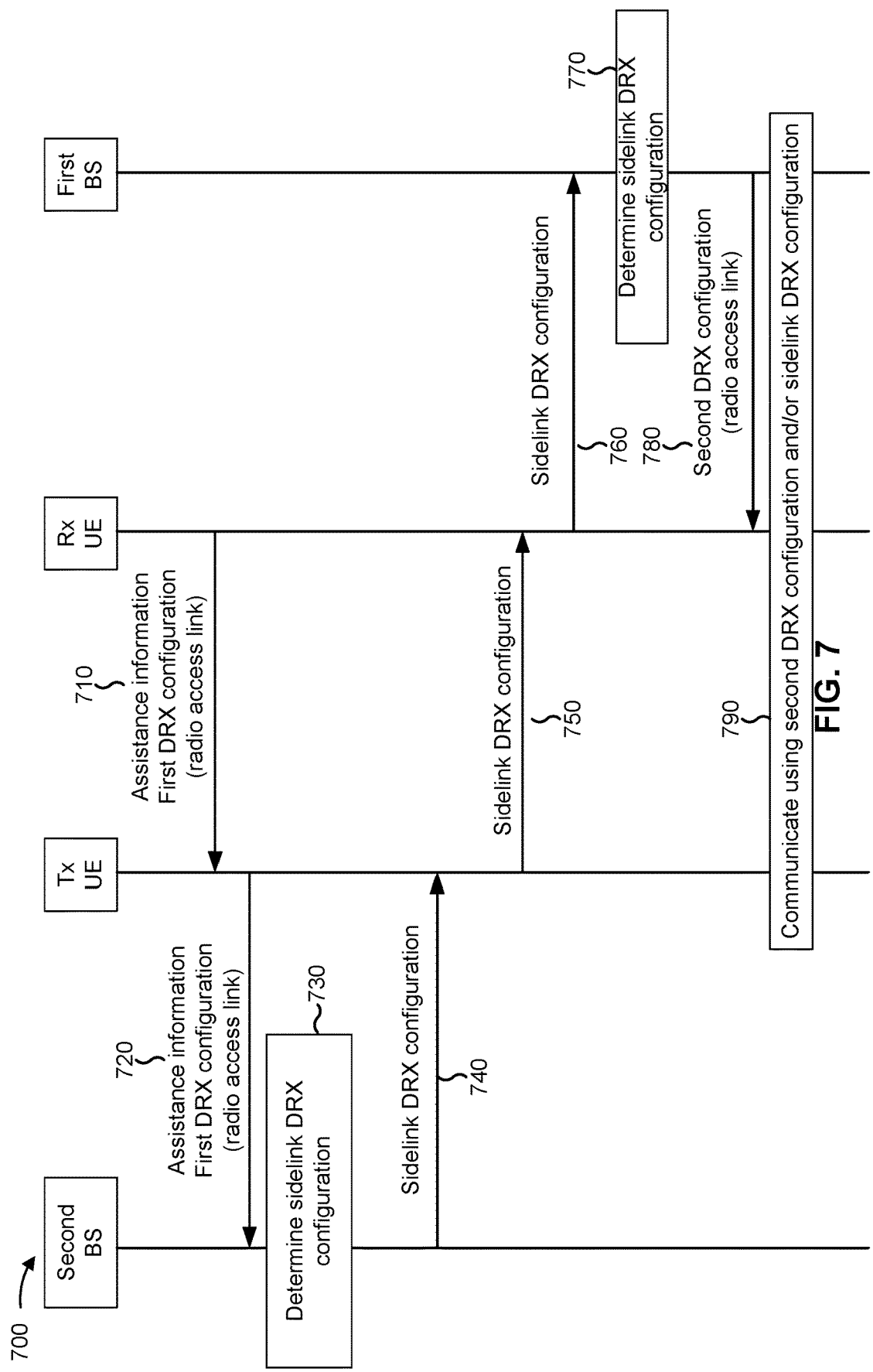
FIG. 7 is a diagram illustrating an example of signaling associated with aligning a radio access DRX configuration and a sidelink DRX configuration, in accordance with the present disclosure.

FIG. 7 is a diagram illustrating an example 700 of signaling associated with aligning a radio access DRX configuration and a sidelink DRX configuration, in accordance with the present disclosure. Example 700 includes a receiver UE (e.g., UE 120, UE 305, UE 405, UE 410), a first base station (e.g., base station 110), a transmitter UE (e.g., UE 120, UE 305, UE 405, UE 410), and a second base station (e.g., base station 110). In example 700, the first base station and the receiver UE are associated with a radio access link and a connection (e.g., an RRC connection). The second base station and the transmitter UE are associated with a radio access link. The first UE and the second UE are associated with a sidelink connection.

As shown in FIG. 7, and by reference number 710, the receiver UE may transmit, to the transmitter UE, a message. For example, the message may include assistance information. The assistance information may include information indicating at least part of a first DRX configuration for a radio access link between the receiver UE and the first base station. For example, the assistance information may include a first DRX configuration or one or more parameters of a first DRX configuration. As used herein, a "first DRX configuration" refers to a radio access DRX configuration for a radio access link between the receiver UE and the base station. In some aspects, the first base station may configure the receiver UE with the first DRX configuration, and the first UE may provide at least part of the first DRX configuration to the transmitter via the assistance information. As shown by reference number 720, the transmitter UE may transmit the assistance information to the second base station. In some aspects, the transmitter UE may transmit an entirety of the assistance information to the second base station. In some other aspects, the transmitter UE may transmit a subset of the assistance information to the second base station.

The first DRX configuration may include one or more parameters. For example, the first DRX configuration may include one or more of a drx-onDurationTimer parameter, a drx-InactivityTimer parameter, a drx-HARQ-RTT-TimerDL parameter, a drx-HARQ-RTT-TimerUL parameter, a drx-RetransmissionTimerDL parameter, a drx-RetransmissionTimerUL, a drx-LongCycleStartOffset parameter, a set of shortDRX parameters (e.g., including a drx-ShortCycle parameter and/or a drx-ShortCycleTimer parameter), a drx-SlotOffset parameter, or the like. In some aspects, the assistance information may include each of the above parameters (e.g., the entire DRX configuration). In some aspects, the assistance information may include a subset of the above parameters. As one example, the assistance information may include one or more of a drx-LongCycleStartOffset parameter, a set of shortDRX parameters (e.g., including a drx-ShortCycle parameter and/or a drx-ShortCycleTimer parameter), and a drx-SlotOffset parameter.

In some aspects, the assistance information may be provided via Layer 3 signaling. For example, the assistance information may be provided via an RRC message. In some aspects, the RRC message may include an entirety of the DRX configuration. In some aspects, the RRC message may include a subset of the DRX configuration, as described above. For example, the RRC message may include one or more DRX parameters relating to aligning a radio access DRX configuration and a sidelink DRX configuration such as one or more of a drx-LongCycleStartOffset parameter, a set of shortDRX parameters (e.g., including a drx-ShortCycle parameter and/or a drx-ShortCycleTimer parameter), or a drx-SlotOffset parameter.

In some aspects, the assistance information may be provided via Layer 2 signaling, such as medium access control (MAC) signaling. For example, refer to example 800 of FIG. 8. Example 800 shows a MAC control element (MAC-CE) signaling structure that can be used to convey the first DRX configuration via the assistance information. For example, the signaling structure may include a field for a DRX slot offset parameter (drx-Slot-Offset), a field for a DRX short cycle length parameter (drx-Short-Cycle), and a field for a DRX long cycle start offset parameter (drx-LongCycleStartOffset). In some aspects, the signaling structure of example 800 may have a variable length, for example, based at least in part on which parameters are to be conveyed using the signaling structure.

In some aspects, the assistance information may include information regarding a short DRX cycle. For example, the assistance information may include one or more parameters associated with a short DRX cycle if the one or more parameters associated with the short DRX cycle are configured for the UE. If the short DRX cycle is not configured for the UE, then the assistance information may not include the one or more parameters associated with the short DRX cycle.

In some aspects, the assistance information may indicate a subset of a set of configured values. For example, a parameter drx-Slot-Offset may have 32 possible values. The first base station may indicate, to the receiver UE, a subset of the 32 values that can be indicated in assistance information. As one example, the first base station may indicate a set of 8 values selected from the 32 values. The assistance information may include an indication of which of the 8 values corresponds to the parameter drx-Slot-Offset for the first DRX configuration. For example, the assistance information may include an N bit indication for a set of 2^N values.

In some aspects, the assistance information may indicate a value of a parameter using MAC or physical layer signaling. For example, the first base station may configure (e.g., using RRC signaling) a set of values for a parameter (such as a drx-LongCycleStartOffset parameter, a shortDRX parameter, or a drx-SlotOffset parameter). The receiver UE may transmit assistance information in the form of MAC or physical signaling, an indication of a selected value of the set of values. Thus, overhead associated with the assistance information may be reduced relative to transmitting an explicit value of the assistance information.

In some aspects, the assistance information may indicate a preferred sidelink DRX configuration, such as one or more preferred values of one or more DRX parameters. In some aspects, the assistance information may indicate one or more DRX parameters associated with another UE. For example, the assistance information may indicate one or more DRX configurations between the receiver UE and one or more other UEs.

As shown by reference number 730, the second base station may determine a sidelink DRX configuration for the receiver UE and the transmitter UE. The sidelink DRX configuration is described in more detail below. In some aspects, the second base station may determine the sidelink DRX configuration based at least in part on the assistance information. For example, the second base station may take into account a preferred sidelink DRX configuration of the receiver UE. As another example, the second base station may take into account one or more DRX configurations between the receiver UE and one or more other UEs. As still another example, the second base station may determine the sidelink DRX configuration based at least in part on one or more parameters of the radio access DRX configuration indicated by the assistance information. In example 700, the sidelink DRX configuration determined by the second base station may not be aligned with the first DRX configuration between the receiver UE and the first base station. For example, a number of overlapped on durations may be lower than a threshold. As another example, a ratio of overlapped on duration to non-overlapped on duration may be lower than a threshold. As still another example, not all on durations of one of the DRX configurations may overlap an on duration of the other of the DRX configurations.

As shown by reference number 740, the second base station may transmit, to the transmitter UE, information indicating the sidelink DRX configuration. For example, the second base station may transmit the information indicating the sidelink DRX configuration via a radio access link between the second base station and the transmitter UE. As shown by reference number 750, the transmitter UE may transmit, to the receiver UE, the information indicating the sidelink DRX configuration. For example, the transmitter UE may transmit an entirety of the sidelink DRX configuration to the receiver UE, or may transmit a subset of the sidelink DRX configuration (e.g., a subset relevant to configuring a sidelink DRX cycle for the receiver UE). As shown by reference number 760, the receiver UE may transmit, to the first base station, information indicating the sidelink DRX configuration. For example, the receiver UE may transmit an entirety of the sidelink DRX configuration to the first base station, or may transmit a subset of the sidelink DRX configuration (e.g., a subset relevant to configuring a second DRX configuration for the receiver UE that is aligned with the sidelink DRX configuration).

The sidelink DRX configuration may include one or more parameters. For example, the sidelink DRX configuration may include one or more of a sl-drx-onDurationTimer parameter, a sl-drx-InactivityTimer parameter, a sl-drx-HARQ-RTT-Timer parameter, a sl-drx-Retransmission-Timer parameter, a sl-drx-StartOffset parameter, a sl-drx-SlotOffset parameter, a sl-drx-Cycle parameter, or the like. In some aspects, the assistance information may include each of the above parameters (e.g., the entire DRX configuration). In some aspects, the assistance information may include a subset of the above parameters. As one example, the assistance information may include one or more of a sl-drx-StartOffset parameter, a sl-drx-SlotOffset parameter, a sl-drx-Cycle parameter, or the like.

In some aspects, the sidelink DRX configuration may be provided via Layer 3 signaling. For example, the sidelink DRX configuration may be provided via an RRC message. In some aspects, the RRC message may include an entirety of the sidelink DRX configuration. In some aspects, the RRC message may include a subset of the sidelink DRX configuration, as described above. For example, the RRC message may include one or more DRX parameters relating to aligning a radio access DRX configuration and a sidelink DRX configuration such as one or more of a sl-drx-StartOffset parameter, a sl-drx-SlotOffset parameter, a sl-drx-Cycle parameter (e.g., which may define a cycle length of the sidelink DRX cycle), or the like.

In some aspects, the assistance information may be provided via Layer 2 signaling, such as MAC signaling. For example, refer to example 805 of FIG. 8. Example 805 shows a MAC-CE signaling structure that can be used to convey the sidelink DRX configuration. For example, the signaling structure may include a field for a sidelink DRX slot offset parameter (sl-drx-Slot-Offset), a field for a sidelink DRX start offset parameter (sl-drx-StartOffset), a field for a sidelink DRX long cycle start offset parameter (sl-drx-LongCycleStartOffset), and a field for a sidelink DRX cycle parameter (sl-drx-cycle). In some aspects, the signaling structure of example 805 may have a variable length, for example, based at least in part on which parameters are to be conveyed using the signaling structure.

In some aspects, the sidelink DRX configuration may be indicated based at least in part on a subset of a set of configured values. For example, a parameter sl-drx-Slot-Offset may have 32 possible values. A base station may indicate, to a UE, a subset of the 32 values that can be indicated in a message indicating a sidelink DRX configuration. As one example, the base station may indicate a set of 8 values selected from the 32 values. The message may include an indication of which of the 8 values corresponds to the parameter sl-drx-Slot-Offset for the sidelink DRX configuration. For example, the indication may include an N bit indication for a set of 2^N values.

In some aspects, a value of a parameter of the sidelink DRX configuration may be indicated using MAC or physical layer signaling. For example, a base station may configure (e.g., using RRC signaling) a set of values for a parameter (such as a sl-drx-Start-Offset parameter, sl-drx-Slot-Offset, and/or a sl-drx-Cycle parameter). The second base station, the transmitter UE, or the receiver UE may MAC or physical signaling including an indication of a selected value of the set of values. Thus, overhead associated with the transmission of the sidelink DRX configuration may be reduced relative to transmitting an explicit value of the sidelink DRX configuration.

As shown by reference number 770, the first base station may determine a second DRX configuration for the radio access link based at least in part on the sidelink DRX configuration. The second DRX configuration may be a radio access DRX configuration. In some aspects, the second DRX configuration may be an updated DRX configuration relative to the first DRX configuration. For example, the first base station may update one or more parameters of the first DRX configuration such that the second DRX configuration and the sidelink DRX configuration are aligned with each other. As one example, a number of overlapped on durations of the second DRX configuration and the sidelink DRX configuration may satisfy a threshold. As another example, a ratio of overlapped on durations to non-overlapped on duration of the second DRX configuration and the sidelink DRX configuration may be lower than a threshold. As still another example, all on durations of the sidelink DRX configuration may overlap an on duration of the second DRX configuration.

As shown by reference number 780, the first base station may transmit, to the receiver UE, information indicating the second DRX configuration. For example, the first base station may transmit a message to the receiver UE that indicates at least part of the second DRX configuration. The second DRX configuration may include one or more parameters. For example, the second DRX configuration may include one or more of a drx-onDurationTimer parameter, a drx-InactivityTimer parameter, a drx-HARQ-RTT-TimerDL parameter, a drx-HARQ-RTT-TimerUL parameter, a drx-RetransmissionTimerDL parameter, a drx-Retransmission-TimerUL, a drx-LongCycleStartOffset parameter, a set of shortDRX parameters (e.g., including a drx-ShortCycle parameter and/or a drx-ShortCycleTimer parameter), a drx-SlotOffset parameter, or the like. In some aspects, the message may include each of the above parameters (e.g., the entire second DRX configuration). In some aspects, the message may include a subset of the above parameters. As one example, the message may include one or more of a drx-LongCycleStartOffset parameter, a set of shortDRX parameters (e.g., including a drx-ShortCycle parameter and/or a drx-ShortCycleTimer parameter), and a drx-SlotOffset parameter.

In some aspects, the second DRX configuration may be provided via Layer 3 signaling. For example, the second DRX configuration may be provided via an RRC message. In some aspects, the RRC message may include an entirety of the second DRX configuration. In some aspects, the RRC message may include a subset of the second DRX configuration, as described above. For example, the RRC message may include one or more DRX parameters relating to aligning the DRX configuration with the sidelink DRX configuration such as one or more of a drx-LongCycleStartOffset parameter, a set of shortDRX parameters (e.g., including a drx-ShortCycle parameter and/or a drx-ShortCycleTimer parameter), or a drx-SlotOffset parameter.

In some aspects, the message may be provided via Layer 2 signaling, such as MAC signaling. For example, refer to example 800 of FIG. 8. Example 800 shows a MAC-CE signaling structure that can be used to convey the second DRX configuration via the assistance information. For example, the signaling structure may include a field for a DRX slot offset parameter (drx-Slot-Offset), a field for a DRX short cycle length parameter (drx-Short-Cycle), and a field for a DRX long cycle start offset parameter (drx-LongCycleStartOffset). In some aspects, the signaling structure of example 800 may have a variable length, for example, based at least in part on which parameters are to be conveyed using the signaling structure.

In some aspects, the message may include information regarding a short DRX cycle. For example, the message may include one or more parameters associated with a short DRX cycle if the one or more parameters associated with the short DRX cycle are configured for the receiver UE. If the short DRX cycle is not configured for the receiver UE, then the message may not include the one or more parameters associated with the short DRX cycle.

In some aspects, the message may indicate a subset of a set of configured values. For example, a parameter drx-Slot-Offset may have 32 possible values. The first base station may indicate, to the receiver UE, a subset of the 32 values that can be indicated in a message. As one example, the first base station may indicate a set of 8 values selected from the 32 values. The message may include an indication of which of the 8 values corresponds to the parameter drx-Slot-Offset for the second DRX configuration. For example, the message may include an N bit indication for a set of 2^N values.

In some aspects, the message may indicate a value of a parameter using MAC or physical layer signaling. For example, the first base station may configure (e.g., using RRC signaling) a set of values for a parameter (such as a drx-LongCycleStartOffset parameter, a shortDRX parameter, or a drx-SlotOffset parameter). The receiver UE may transmit a message in the form of MAC or physical signaling including an indication of a selected value of the set of values. Thus, overhead associated with the message may be reduced relative to transmitting an explicit value of the second DRX configuration.

As shown by reference number 790, the receiver UE, the first base station, and/or the transmitter UE may communicate with each other. For example, the transmitter UE may transmit a communication to the receiver UE in accordance with the sidelink DRX configuration. As another example, the base station may transmit a communication to the receiver UE in accordance with the second DRX configuration. As still another example, the receiver UE may provide assistance information to the transmitter UE and/or the second base station indicating the second DRX configuration. As yet another example, the receiver UE may be in an on duration for the sidelink DRX configuration and the second DRX configuration at the same time. In this way, power usage of the receiver UE is reduced.

Figure 8:
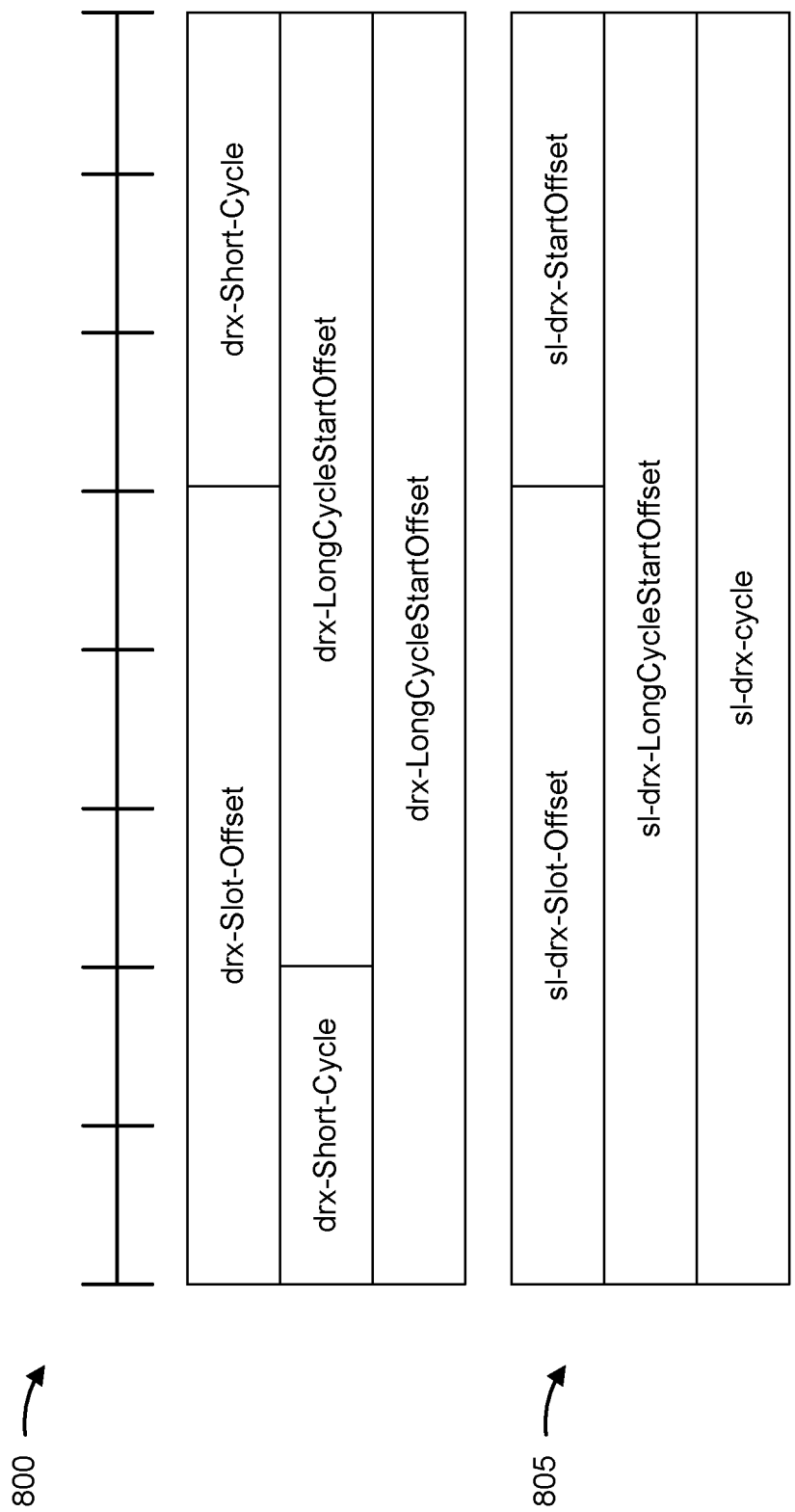
FIG. 8 shows a medium access control control element (MAC-CE) signaling structure that can be used to convey a discontinuous reception configuration.

As indicated above, FIGS. 7 and 8 are provided as examples. Other examples may differ from what is described with regard to FIGS. 7 and 8.

Figure 9:
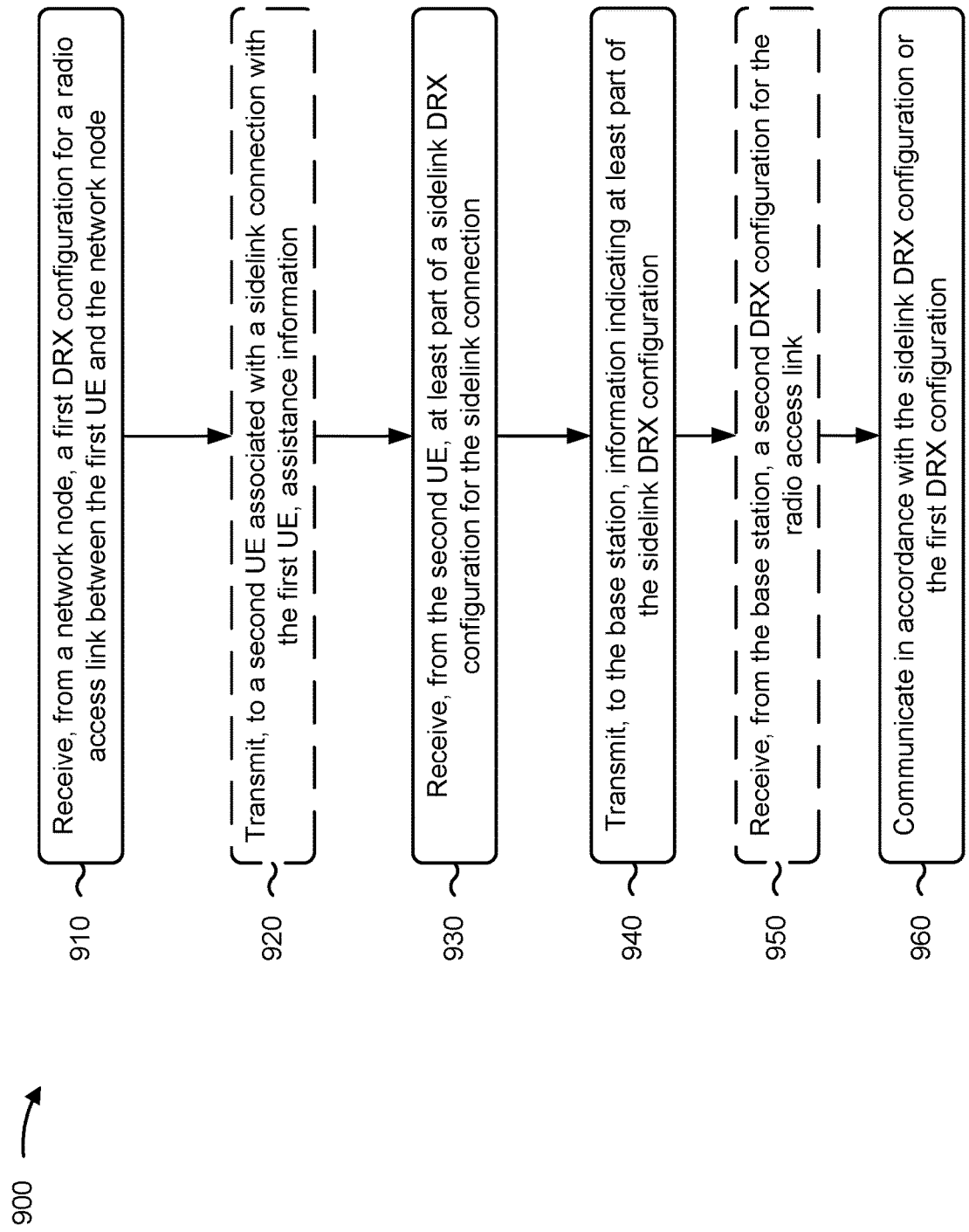
FIG. 9 is a diagram illustrating an example process performed, for example, by a first UE, in accordance with the present disclosure.

FIG. 9 is a diagram illustrating an example process 900 performed, for example, by a first UE, in accordance with the present disclosure. Example process 900 is an example where the first UE (e.g., UE 120, UE 305, UE 405, UE 410) performs operations associated with radio access and sidelink discontinuous reception alignment.

As shown in FIG. 9, in some aspects, process 900 may include receiving, from a network node, a first DRX configuration for a radio access link between the first UE and the network node (block 910). For example, the first UE (e.g., using communication manager 140 and/or reception component 1102, depicted in FIG. 11) may receive, from a network node, a first discontinuous reception (DRX) configuration for a radio access link between the first UE and the network node, as described above.

As shown in FIG. 9, in some aspects, process 900 may include transmitting, to a second UE associated with a sidelink connection with the first UE, assistance information (block 920). For example, the first UE (e.g., using communication manager 140 and/or transmission component 1104, depicted in FIG. 11) may transmit, to a second UE associated with a sidelink connection with the first UE, assistance information. In some aspects, the assistance information may indicate at least part of the first DRX configuration for the radio access link, as described above. In some aspects, the assistance information may indicate a preferred sidelink DRX configuration, as described elsewhere herein.

Figure 11:
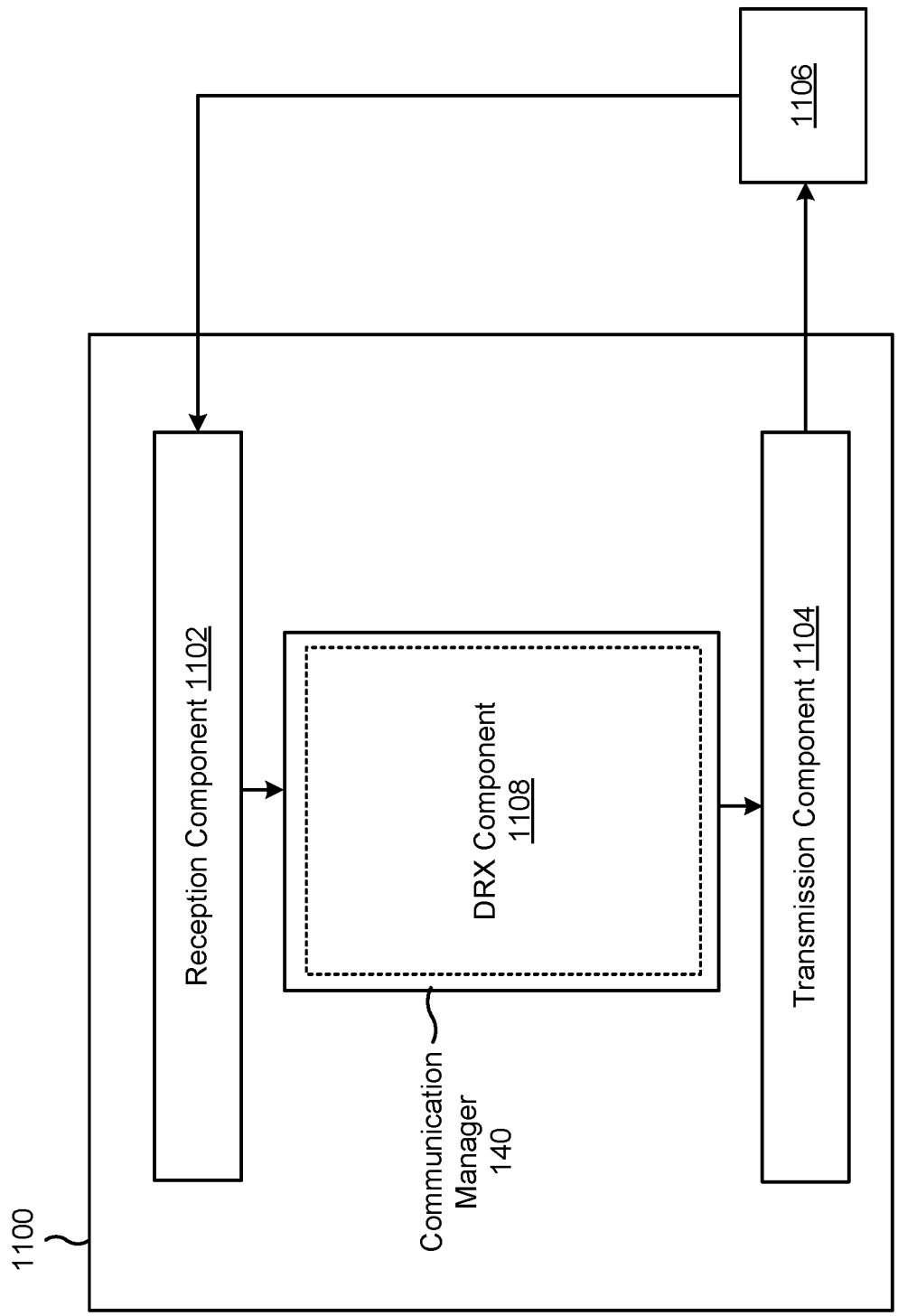
FIG. 11 is a diagram of an example apparatus for wireless communication.

As further shown in FIG. 9, in some aspects, process 900 may include receiving, from the second UE, at least part of a sidelink DRX configuration for the sidelink connection (e.g., using communication manager 140 and/or reception component 1102, depicted in FIG. 11) may receive, from the second UE, at least part of a sidelink DRX configuration for the sidelink connection. In some examples, an on duration of the sidelink DRX configuration is not aligned with an on duration of the first DRX configuration, as described above.

As further shown in FIG. 9, in some aspects, process 900 may include transmitting, to the network node, information indicating at least part of the sidelink DRX configuration (block 940). For example, the first UE (e.g., using communication manager 140 and/or transmission component 1104, depicted in FIG. 11) may transmit, to the network node, information indicating at least part of the sidelink DRX configuration, as described above.

As further shown in FIG. 9, in some aspects, process 900 may include receiving, from the network node, a second DRX configuration for the radio access link (block 950). For example, the first UE (e.g., using communication manager 140 and/or reception component 1102, depicted in FIG. 11) may receive, from the network node, a second DRX configuration for the radio access link, as described above.

As further shown in FIG. 9, in some aspects, process 900 may include communicating in accordance with the sidelink DRX configuration or the second DRX configuration (block 960). For example, the first UE (e.g., using communication manager 140 and/or DRX component 1108, depicted in FIG. 11) may communicate in accordance with the sidelink DRX configuration or the second DRX configuration, as described above. In some aspects, the first UE may communicate in accordance with the first DRX configuration (for example, if the first UE has not received a second DRX configuration).

Process 900 may include additional aspects, such as any single aspect or any combination of aspects described below and/or in connection with one or more other processes described elsewhere herein.

In a first aspect, the second DRX configuration has one or more parameters that are modified relative to the first DRX configuration including at least one of a DRX slot offset, a DRX start offset, a DRX short cycle, or a DRX long cycle start offset.

In a second aspect, alone or in combination with the first aspect, the assistance information is provided via a radio resource control (RRC) message.

In a third aspect, alone or in combination with one or more of the first and second aspects, the RRC message includes an entirety of the first DRX configuration.

In a fourth aspect, alone or in combination with one or more of the first through third aspects, the RRC message includes a subset of the first DRX configuration.

In a fifth aspect, alone or in combination with one or more of the first through fourth aspects, the assistance information is provided via a medium access control (MAC) message.

In a sixth aspect, alone or in combination with one or more of the first through fifth aspects, the MAC message includes one or more parameters of the first DRX configuration that can be modified in the second DRX configuration.

In a seventh aspect, alone or in combination with one or more of the first through sixth aspects, one or more fields of the MAC message have a variable length.

In an eighth aspect, alone or in combination with one or more of the first through seventh aspects, the MAC message indicates a selected parameter from a set of configured parameters for the first DRX configuration.

In a ninth aspect, alone or in combination with one or more of the first through eighth aspects, the assistance information indicates a selected parameter from a set of configured parameters for the first DRX configuration via physical layer signaling.

In a tenth aspect, alone or in combination with one or more of the first through ninth aspects, the assistance information includes at least one of information indicating a preferred sidelink DRX configuration, or information indicating a sidelink DRX configuration between the first UE and another UE other than the second UE.

In an eleventh aspect, alone or in combination with one or more of the first through tenth aspects, the information indicating at least part of the sidelink DRX configuration is received via a radio resource control (RRC) message.

In a twelfth aspect, alone or in combination with one or more of the first through eleventh aspects, the RRC message includes an entirety of the sidelink DRX configuration.

In a thirteenth aspect, alone or in combination with one or more of the first through twelfth aspects, the RRC message includes a subset of the sidelink DRX configuration.

In a fourteenth aspect, alone or in combination with one or more of the first through thirteenth aspects, the information indicating at least part of the sidelink DRX configuration is provided via a medium access control (MAC) message.

In a fifteenth aspect, alone or in combination with one or more of the first through fourteenth aspects, the MAC message includes one or more parameters of the sidelink DRX configuration used to determine the second DRX configuration.

In a sixteenth aspect, alone or in combination with one or more of the first through fifteenth aspects, the MAC message has a variable length.

In a seventeenth aspect, alone or in combination with one or more of the first through sixteenth aspects, the MAC message indicates a selected parameter from a set of configured parameters for the sidelink DRX configuration.

In an eighteenth aspect, alone or in combination with one or more of the first through seventeenth aspects, the information indicating at least part of the sidelink DRX configuration indicates, via physical layer signaling, a selected parameter from a set of configured parameters for the sidelink DRX configuration.

In a nineteenth aspect, alone or in combination with one or more of the first through eighteenth aspects, the second DRX configuration is received via a radio resource control (RRC) message.

In a twentieth aspect, alone or in combination with one or more of the first through nineteenth aspects, the RRC message includes an entirety of the second DRX configuration.

In a twenty-first aspect, alone or in combination with one or more of the first through twentieth aspects, the RRC message includes a subset of the second DRX configuration.

In a twenty-second aspect, alone or in combination with one or more of the first through twenty-first aspects, the second DRX configuration is received via a medium access control (MAC) message.

In a twenty-third aspect, alone or in combination with one or more of the first through twenty-second aspects, the MAC message includes one or more updated parameters of the second DRX configuration.

In a twenty-fourth aspect, alone or in combination with one or more of the first through twenty-third aspects, the MAC message has a variable length.

In a twenty-fifth aspect, alone or in combination with one or more of the first through twenty-fourth aspects, the MAC message indicates a selected parameter from a set of configured parameters for the second DRX configuration.

In a twenty-sixth aspect, alone or in combination with one or more of the first through twenty-fifth aspects, the reception of the second DRX configuration further comprises receiving, via physical layer signaling, an indication of a selected parameter from a set of configured parameters for the second DRX configuration.

In a twenty-seventh aspect, alone or in combination with one or more of the first through twenty-sixth aspects, the sidelink DRX configuration is based at least in part on the first DRX configuration.

In a twenty-eighth aspect, alone or in combination with one or more of the first through twenty-seventh aspects, an on duration of the sidelink DRX configuration is aligned with an on duration of the first DRX configuration.

In a twenty-ninth aspect, alone or in combination with one or more of the first through twenty-eighth aspects, an on duration of the second DRX configuration is aligned with an on duration of the sidelink DRX configuration.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
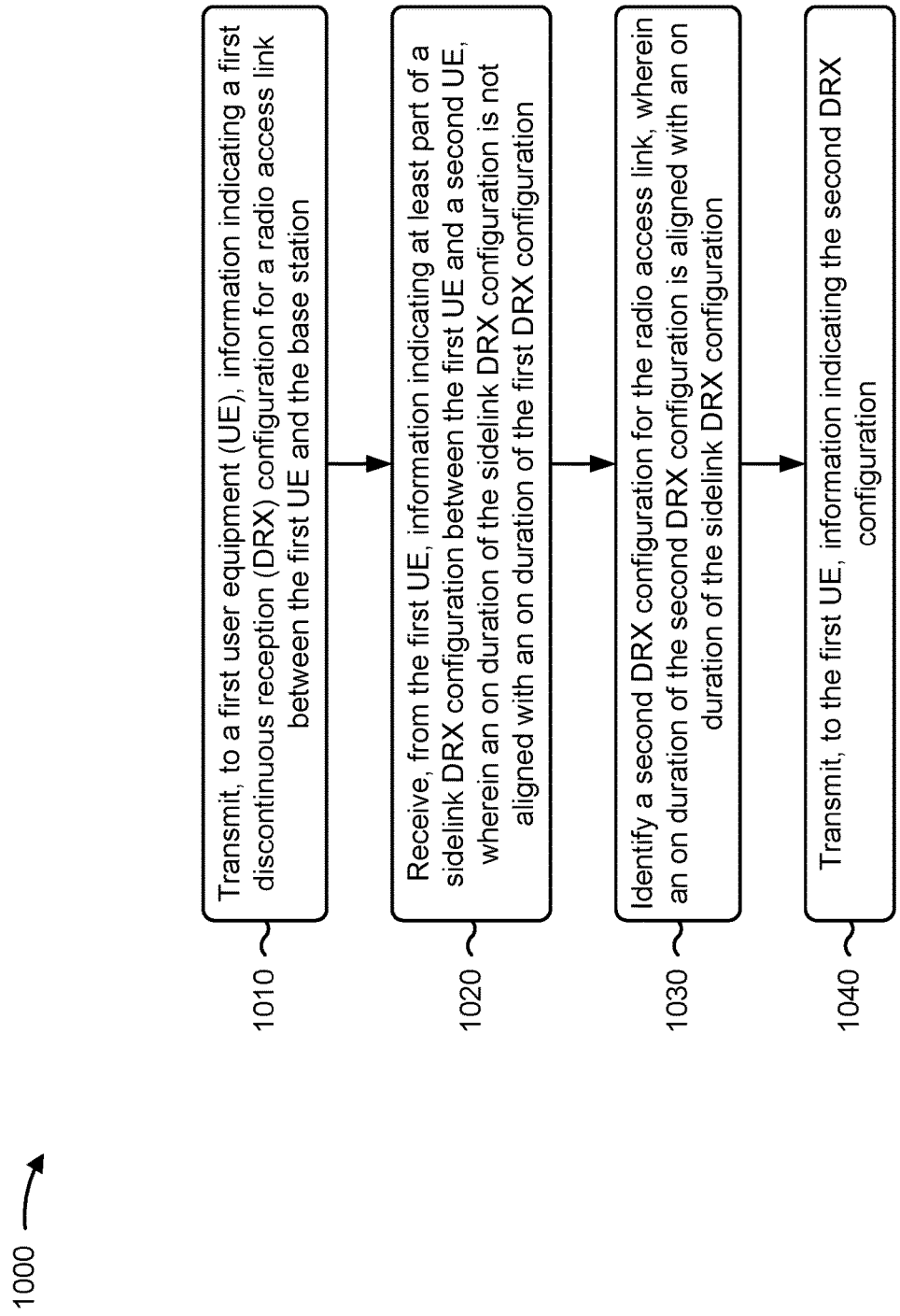
FIG. 10 is a diagram illustrating an example process performed, for example, by a base station, in accordance with the present disclosure.

FIG. 10 is a diagram illustrating an example process 1000 performed, for example, by a base station, in accordance with the present disclosure. Example process 1000 is an example where the base station (e.g., base station 110, a network node of a disaggregated base station) performs operations associated with radio access and sidelink discontinuous reception alignment.

As shown in FIG. 10, in some aspects, process 1000 may include transmitting, to a first UE, information indicating a first discontinuous reception (DRX) configuration for a radio access link between the first UE and the base station (block 1010). For example, the base station (e.g., using communication manager 150 and/or transmission component 1204, depicted in FIG. 12) may transmit, to a first user equipment (UE), information indicating a first discontinuous reception (DRX) configuration for a radio access link between the first UE and the base station, as described above.

As further shown in FIG. 10, in some aspects, process 1000 may include receiving, from the first UE, information indicating at least part of a sidelink DRX configuration between the first UE and a second UE, wherein an on duration of the sidelink DRX configuration is not aligned with an on duration of the first DRX configuration (block 1020). For example, the base station (e.g., using communication manager 150 and/or reception component 1202, depicted in FIG. 12) may receive, from the first UE, information indicating at least part of a sidelink DRX configuration between the first UE and a second UE, wherein an on duration of the sidelink DRX configuration is not aligned with an on duration of the first DRX configuration, as described above.

As further shown in FIG. 10, in some aspects, process 1000 may include identifying a second DRX configuration for the radio access link, wherein an on duration of the second DRX configuration is aligned with an on duration of the sidelink DRX configuration (block 1030). For example, the base station (e.g., using communication manager 150 and/or identification component 1210, depicted in FIG. 12) may identify a second DRX configuration for the radio access link, wherein an on duration of the second DRX configuration is aligned with an on duration of the sidelink DRX configuration, as described above.

As further shown in FIG. 10, in some aspects, process 1000 may include transmitting, to the first UE, information indicating the second DRX configuration (block 1040). For example, the base station (e.g., using communication manager 150 and/or transmission component 1204, depicted in FIG. 12) may transmit, to the first UE, information indicating the second DRX configuration, as described above.

Process 1000 may include additional aspects, such as any single aspect or any combination of aspects described below and/or in connection with one or more other processes described elsewhere herein.

In a first aspect, the second DRX configuration has one or more parameters that are modified relative to the first DRX configuration including at least one of a DRX slot offset, a DRX start offset, a DRX short cycle, or a DRX long cycle start offset.

In a second aspect, alone or in combination with the first aspect, the information indicating at least part of the sidelink DRX configuration is received via a radio resource control (RRC) message.

In a third aspect, alone or in combination with one or more of the first and second aspects, the RRC message includes an entirety of the sidelink DRX configuration.

In a fourth aspect, alone or in combination with one or more of the first through third aspects, the RRC message includes a subset of the sidelink DRX configuration.

In a fifth aspect, alone or in combination with one or more of the first through fourth aspects, the information indicating at least part of the sidelink DRX configuration is received via a medium access control (MAC) message.

In a sixth aspect, alone or in combination with one or more of the first through fifth aspects, the MAC message includes one or more parameters of the sidelink DRX configuration used to determine the second DRX configuration.

In a seventh aspect, alone or in combination with one or more of the first through sixth aspects, the MAC message has a variable length.

In an eighth aspect, alone or in combination with one or more of the first through seventh aspects, the MAC message indicates a selected parameter from a set of configured parameters for the sidelink DRX configuration.

In a ninth aspect, alone or in combination with one or more of the first through eighth aspects, the information indicating at least part of the sidelink DRX configuration indicates, via physical layer signaling, a selected parameter from a set of configured parameters for the sidelink DRX configuration.

In a tenth aspect, alone or in combination with one or more of the first through ninth aspects, the second DRX configuration is transmitted via a radio resource control (RRC) message.

In an eleventh aspect, alone or in combination with one or more of the first through tenth aspects, the RRC message includes an entirety of the second DRX configuration.

In a twelfth aspect, alone or in combination with one or more of the first through eleventh aspects, the RRC message includes a subset of the second DRX configuration.

In a thirteenth aspect, alone or in combination with one or more of the first through twelfth aspects, the second DRX configuration is transmitted via a medium access control (MAC) message.

In a fourteenth aspect, alone or in combination with one or more of the first through thirteenth aspects, the MAC message includes one or more updated parameters of the second DRX configuration.

In a fifteenth aspect, alone or in combination with one or more of the first through fourteenth aspects, the MAC message has a variable length.

In a sixteenth aspect, alone or in combination with one or more of the first through fifteenth aspects, the MAC message indicates a selected parameter from a set of configured parameters for the second DRX configuration.

In a seventeenth aspect, alone or in combination with one or more of the first through sixteenth aspects, transmitting the information indicating the second DRX configuration further comprises transmitting, via physical layer signaling, an indication of a selected parameter from a set of configured parameters for the second DRX configuration.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a DRX component 1108, among other examples.

In some aspects, the apparatus 1100 may be configured to perform one or more operations described herein in connection with FIGS. 3-8. Additionally, or alternatively, the apparatus 1100 may be configured to perform one or more processes described herein, such as process 900 of FIG. 9, or a combination thereof. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The transmission component 1104 may transmit, to a second UE associated with a sidelink connection with the first UE, assistance information indicating at least part of a first discontinuous reception (DRX) configuration for a radio access link between the first UE and a base station. The reception component 1102 may receive, from the second UE, at least part of a sidelink DRX configuration for the sidelink connection, wherein an on duration of the sidelink DRX configuration is not aligned with an on duration of the first DRX configuration. The transmission component 1104 may transmit, to the base station, information indicating at least part of the sidelink DRX configuration. The reception component 1102 may receive, from the base station, a second DRX configuration for the radio access link. The DRX component 1108 may communicate in accordance with the sidelink DRX configuration or the second DRX configuration.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
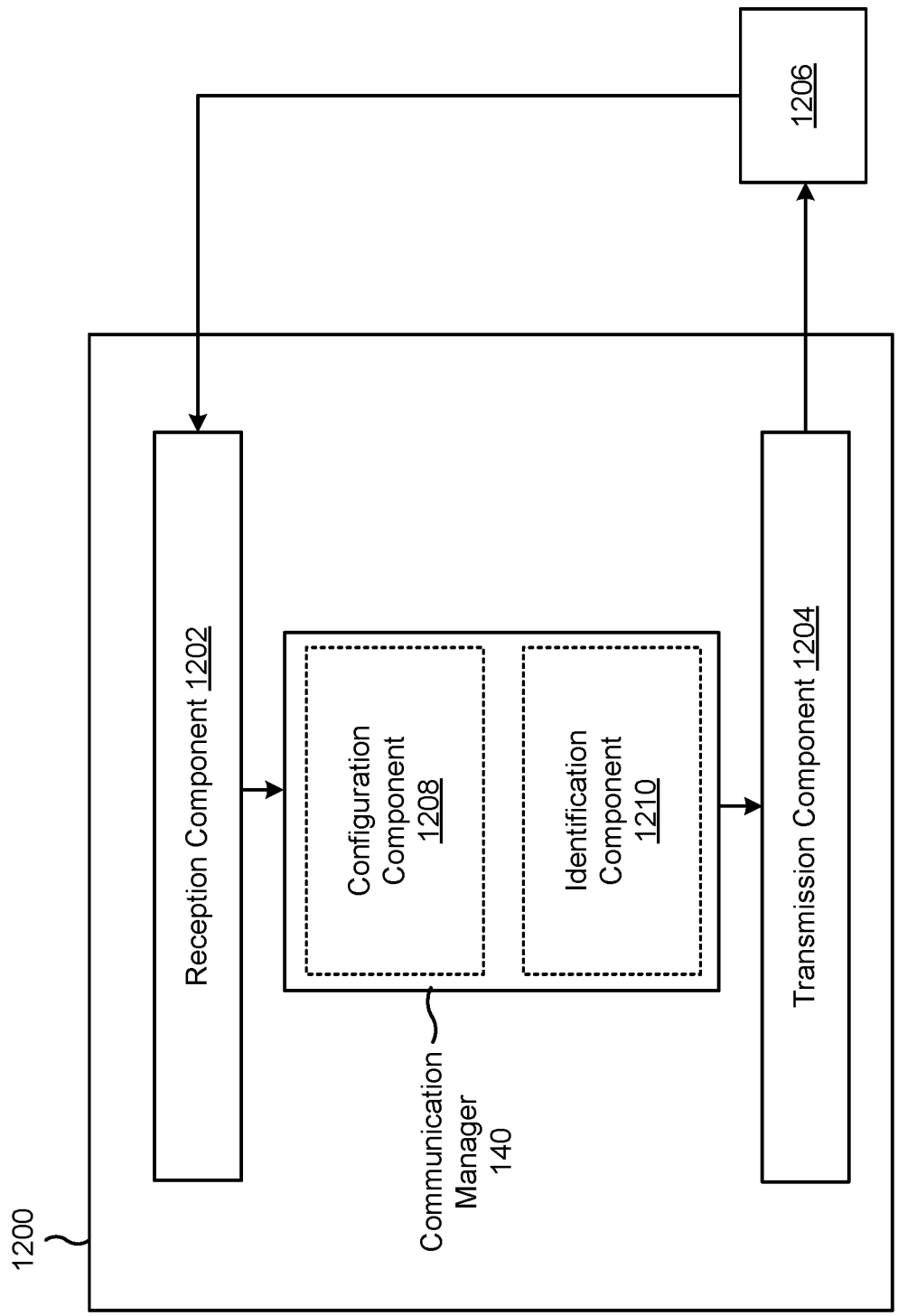
FIG. 12 is a diagram of an example apparatus for wireless communication.

FIG. 12 is a diagram of an example apparatus 1200 for wireless communication. The apparatus 1200 may be a base station (such as the first base station of FIG. 7), or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a configuration component 1208 or an identification component 1210, among other examples.

In some aspects, the apparatus 1200 may be configured to perform one or more operations described herein in connection with FIGS. 3-8. Additionally, or alternatively, the apparatus 1200 may be configured to perform one or more processes described herein, such as process 1000 of FIG. 10, or a combination thereof. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The transmission component 1204 or the configuration component 1208 may transmit, to a first user equipment (UE), information indicating a first discontinuous reception (DRX) configuration for a radio access link between the first UE and the base station. The reception component 1202 may receive, from the first UE, information indicating at least part of a sidelink DRX configuration between the first UE and a second UE, wherein an on duration of the sidelink DRX configuration is not aligned with an on duration of the first DRX configuration. The identification component 1210 may identify a second DRX configuration for the radio access link, wherein an on duration of the second DRX configuration is aligned with an on duration of the sidelink DRX configuration. The transmission component 1204 may transmit, to the first UE, information indicating the second DRX configuration.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
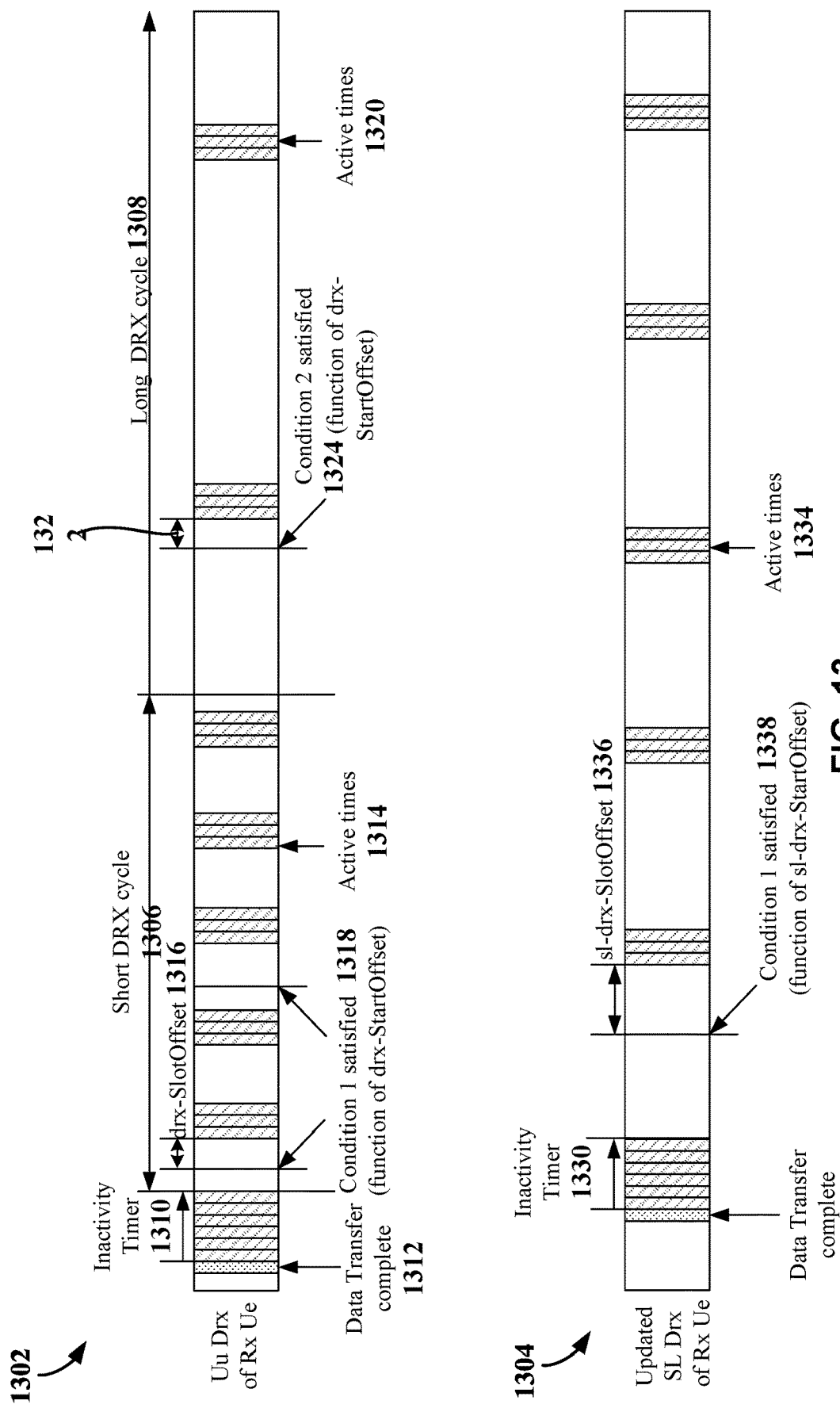
FIG. 13 illustrates an example of DRX timing for Uu DRX and an example of DRX timing for sidelink DRX, in accordance with the present disclosure.

FIG. 13 illustrates an example of DRX timing 1302 for Uu DRX and an example of DRX timing 1304 for SL DRX. The Uu DRX and the SL DRX each employ timer-based DRX cycles.

The DRX timing 1302 illustrates an example of a short DRX cycle 1306 and a long DRX cycle 1308. An inactivity timer 1310 is started once a data transfer 1312 is complete. The short DRX 1306 cycle commences upon expiration of the inactivity timer 1310 (e.g., indicating that the UE has not received any data on the Uu link for that period of time). The periodic active times 1314 (i.e., the times during which the UE will wake up) commence a period of time (a drx-SlotOffset 1316) following the time when a first condition (condition 1) 1318 is met. In some aspects, the first condition may be based on a drx-StartOffset. Similarly, for the long DRX cycle 1308, periodic active times 1320 commence a period of time (a drx-SlotOffset 1322) following the time when a second condition (condition 2) 1324 is met. In some aspects, the second condition may be based on the drx-StartOffset.

For the DRX timing 1304, an inactivity timer 1330 is started once a data transfer 1332 is complete. The DRX cycle commences upon expiration of the inactivity timer 1330 (e.g., indicating that the UE has not received on the sidelink any data for that period of time). The periodic active times 1334 commence a period of time (a sidelink offset, sl-drx-SlotOffset 1336) following the time when a first condition (condition 1) 1338 is met. In some aspects, the first condition may be based on a sidelink offset (sl-drx-StartOffset).

As shown in the example of FIG. 13, the periodic active times 1334 for the DRX timing 1304 are not aligned with the periodic active times 1314 for the DRX timing 1302. The disclosure relates in some aspects to aligning some or all of the periodic active times 1334 for the DRX timing 1304 with the periodic active times 1314 for the DRX timing 1302.

In some examples, given an Rx UE's Uu DRX, the Tx UE's gNB may set the SL DRX of the Rx UE to align with the Rx UE's Uu DRX by setting one or more parameters related to alignment. In the example of FIG. 13, the start of active times for the DRX timing 1304 is controlled by sl-drx-StartOffset, sl-drx-SlotOffset and sl-drx-Cycle. Thus, in some examples, the Tx UE's gNB may set the sl-drx-StartOffset, sl-drx-SlotOffset, and sl-drx-Cycle parameters based on the Rx UE's Uu DRX.

Figure 14:
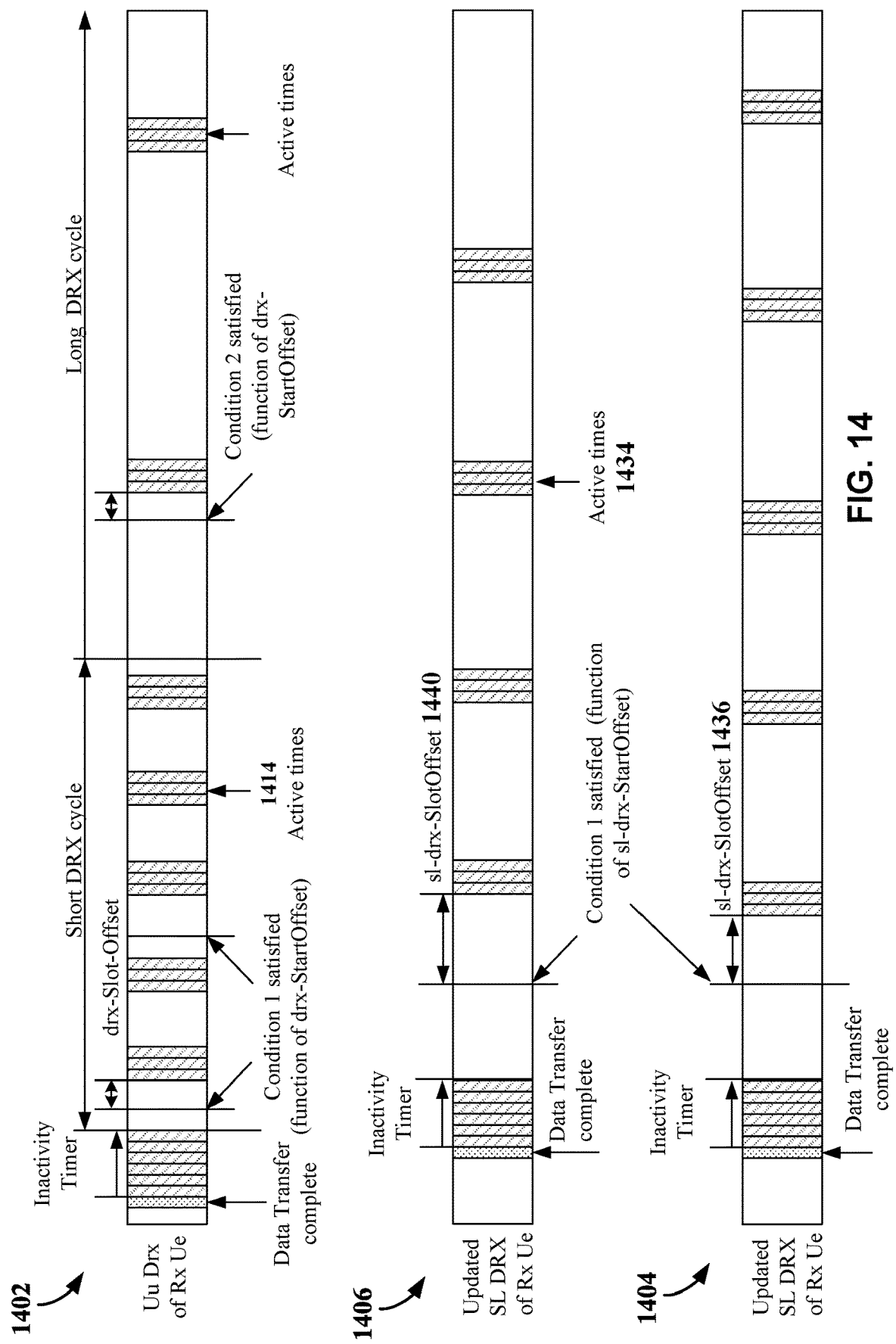
FIG. 14 illustrates an example where the sl-drx-SlotOffset parameter has been adjusted to align the sidelink (SL) DRX timing with the Uu DRX timing, in accordance with the present disclosure.

FIG. 14 illustrates an example where the sl-drx-SlotOffset parameter has been adjusted to align the SL DRX timing with the Uu DRX timing. The DRX timing 1402 of FIG. 14 corresponds to the DRX timing 1802 of FIG. 18. In addition, the DRX timing 1404 of FIG. 14 corresponds to the DRX timing 1804 of FIG. 18. In the DRX timing 1406 of FIG. 14, the sl-drx-SlotOffset parameter 1436 of the DRX timing 1404 has been adjusted to provide an adjusted sl-drx-SlotOffset parameter 1440. As shown in FIG. 14, this adjustment aligns at least some of the periodic active times 1434 for the DRX timing 1406 with the periodic active times 1414 for the DRX timing 1402.

Figure 15:
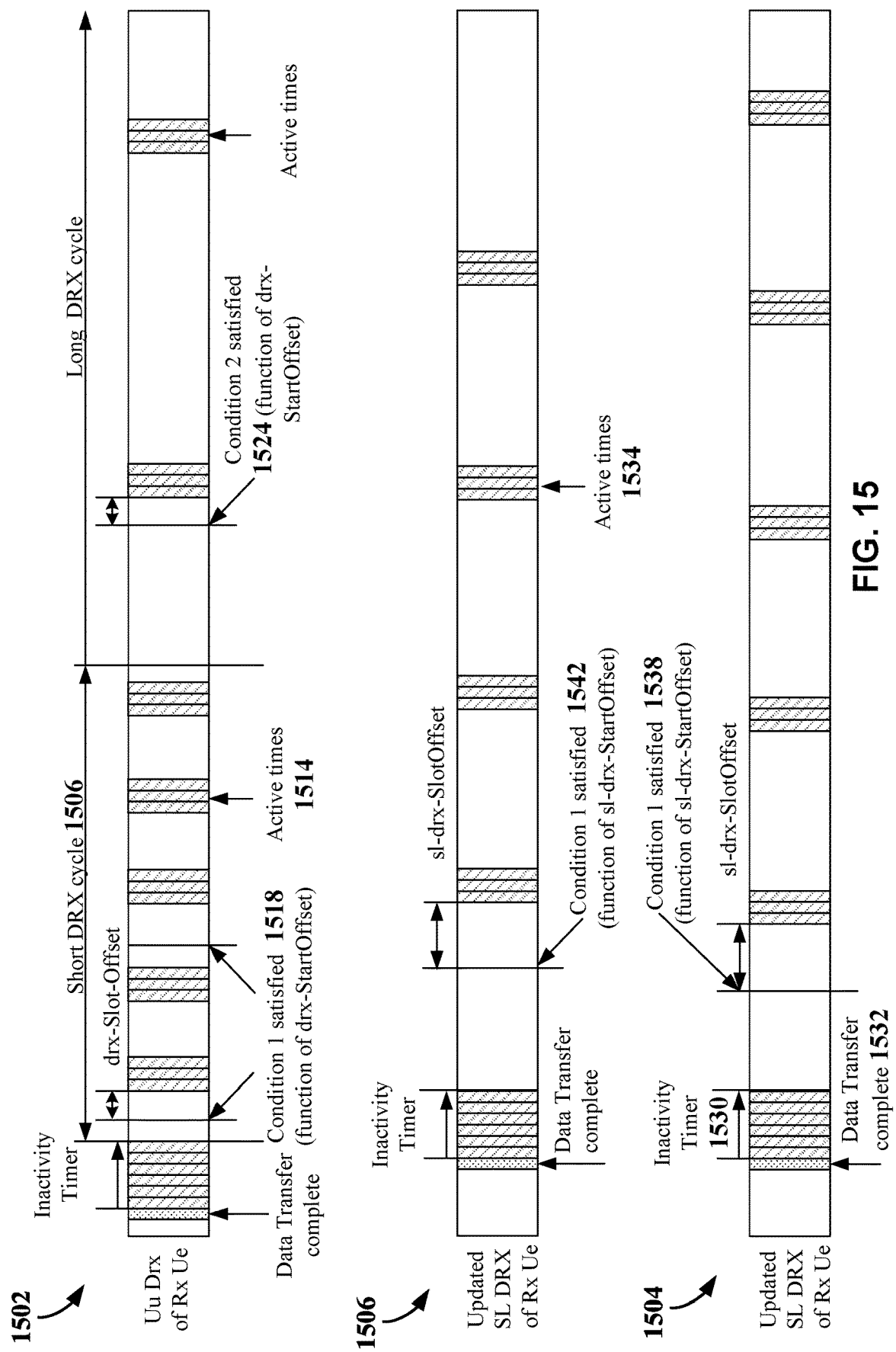
FIG. 15 illustrates an example where the sl-drx-StartOffset parameter has been adjusted to align the SL DRX timing with the sidelink DRX timing, in accordance with the present disclosure.

FIG. 15 illustrates an example where the sl-drx-StartOffset parameter has been adjusted to align the SL DRX timing with the Uu DRX timing. The DRX timing 1502 of FIG. 15 corresponds to the DRX timing 1302 of FIG. 13. In addition, the DRX timing 1504 of FIG. 15 corresponds to the DRX timing 1304 of FIG. 13. In the DRX timing 1506 of FIG. 15, the sl-drx-StartOffset parameter 1538 of the DRX timing 1504 has been adjusted to provide an adjusted sl-drx-StartOffset parameter 1542. As shown in FIG. 15, this adjustment aligns at least some of the periodic active times 1534 for the DRX timing 1506 with the periodic active times 1514 for the DRX timing 1502.

Figure 16:
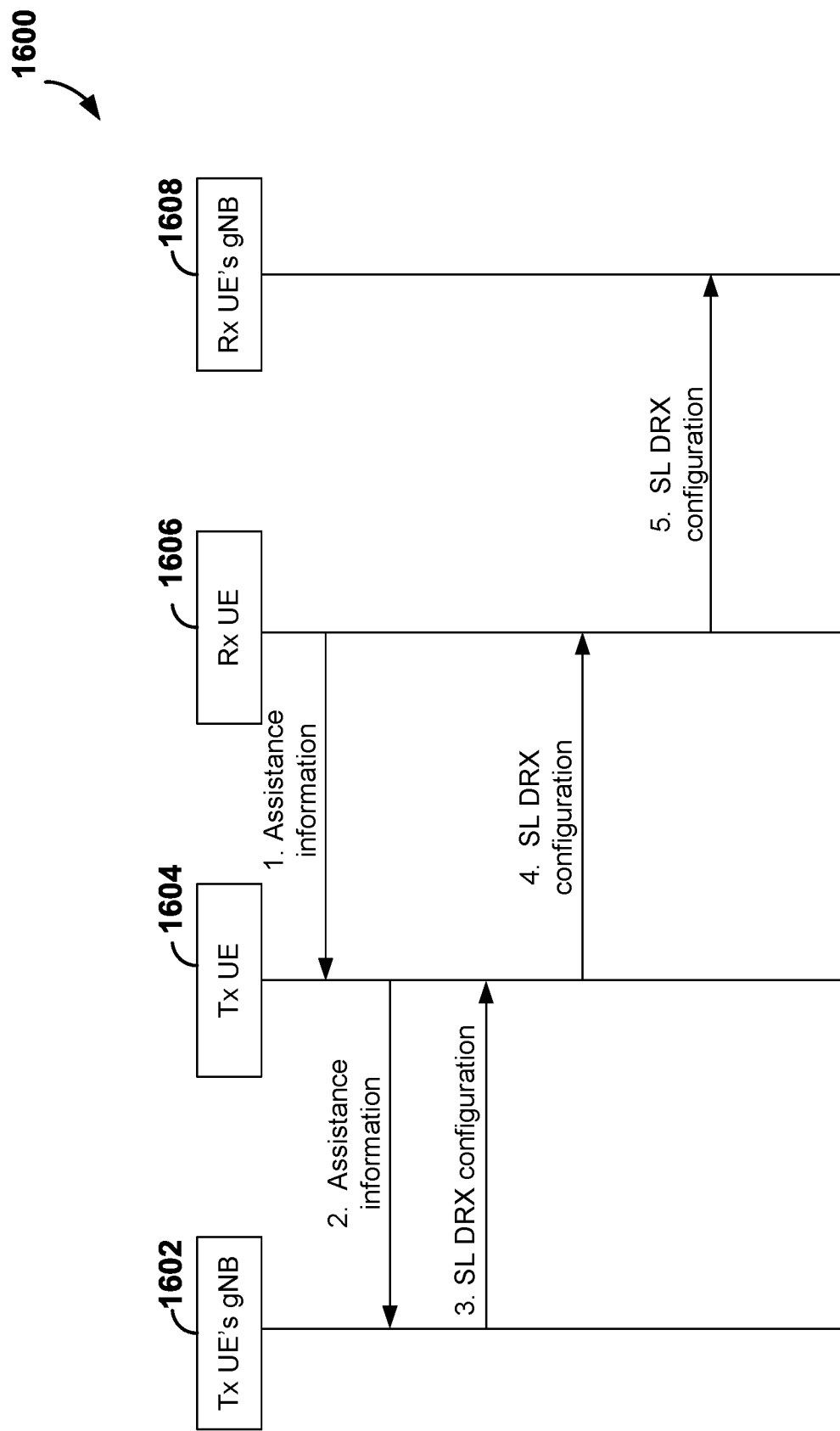
FIG. 16 is a diagram illustrating an example of signaling associated with updating the value of sl-drx-StartOffset and sl-drx-SlotOffset for a receive UE, in accordance with the present disclosure.

FIG. 16 is a diagram illustrating an example of signaling 1600 associated with updating the value of sl-drx-StartOffset and sl-drx-SlotOffset for an Rx UE (e.g., where the SL DRX is Tx centric) in a wireless communication network including a first base station 1602 (e.g., the serving gNB for a Tx UE), a first UE 1604 (e.g., a Tx UE), a second UE 1606 (e.g., an Rx UE), and a second base station 1608 (e.g., the serving gNB for the Rx UE). In some examples, the first base station 1602 and the second base station 1608 may correspond to any of the base stations or scheduling entities described herein. In some examples, the first UE 1604 and the second UE 1606 may correspond to any of the UEs, scheduled entities, D2D devices, or sidelink devices described herein.

At 1 of FIG. 16, the second UE 1606 (Rx UE) sends assistance information (e.g., including the RX UE's Uu DRX configuration) to the first UE 1604 (Tx UE) via a sidelink connection. In some examples, the second UE 1606 receives the Uu DRX configuration from the second base station 1608. In some examples, the Uu DRX configuration information takes the form of the information in Table 1 or Table 2 of FIG. 17. In some examples, the Uu DRX configuration sent at 1 takes the form of an index into a set of DRX configurations.

At 2, the first UE 1604 (Tx UE) forwards the assistance information to the first base station 1602 (e.g., the Tx UE's connected gNB). For example, the first UE 1604 may transmit this information via an RRC message, a MAC-CE, or some other type of signaling.

At 3, the first base station 1602 (the Tx UE's connected gNB responsible for the alignment when determining the SL DRX configuration) generates the SL DRX configuration based on the received Uu DRX configuration and sends it to the first UE 1604 (Tx UE). For example, the first base station 1602 may transmit this information via an RRC message, a MAC-CE, or some other type of signaling. In some examples, the first base station 1602 generates SL DRX parameters (e.g., offsets, etc.) that will result in the wake times for the second UE 1606 for the SL DRX aligning (i.e., substantially aligning) with wake times specified for the second UE 1606 by the Uu DRX configuration. In some examples, the SL DRX configuration information takes the form of the information in Table 3 or Table 4 of FIG. 18.

At 4, the first UE 1604 (Tx UE) forwards the SL DRX configuration to the second UE 1606. For example, the first UE 1604 (Rx UE) may transmit this information via an RRC message, a MAC-CE, or some other type of signaling.

At optional 5, the second UE 1606 (Rx UE) may forward the SL DRX configuration to the second base station 1608 (e.g., the Rx UE's connected gNB).

The disclosure relates in some aspects to using protocol Layer 3 (L3) signaling for signaling the assistance information of FIG. 16. For example, an RRC message may carry the Uu DRX configuration. In some examples, the RRC message may contain the whole DRX configuration (e.g., a conventional DRX-Config as shown in Table 1). In some examples, the RRC message may contain a subset of the Uu DRX configuration related to alignment (e.g., a new DRX-Config-Alignment as shown in Table 2).

TABLE 1

```
DRX-Config ::= SEQUENCE {
    drx-onDurationTimer,
    drx-InactivityTimer,
    drx-HARQ-RTT-TimerDL,
    drx-HARQ-RTT-TimerUL,
    drx-RetransmissionTimerDL,
    drx-RetransmissionTimerUL,
    drx-LongCycleStartOffset,
    shortDRX SEQUENCE {
      drx-ShortCycle,
      drx-ShortCycleTimer
    },
    drx-SlotOffset
}
```

TABLE 2

```
DRX-Config-Alignment ::= SEQUENCE {
    drx-LongCycleStartOffset,
    shortDRX SEQUENCE {
      drx-ShortCycle
      drx-ShortCycleTimer
    },
      drx-SlotOffset
}
```

Figure 17:
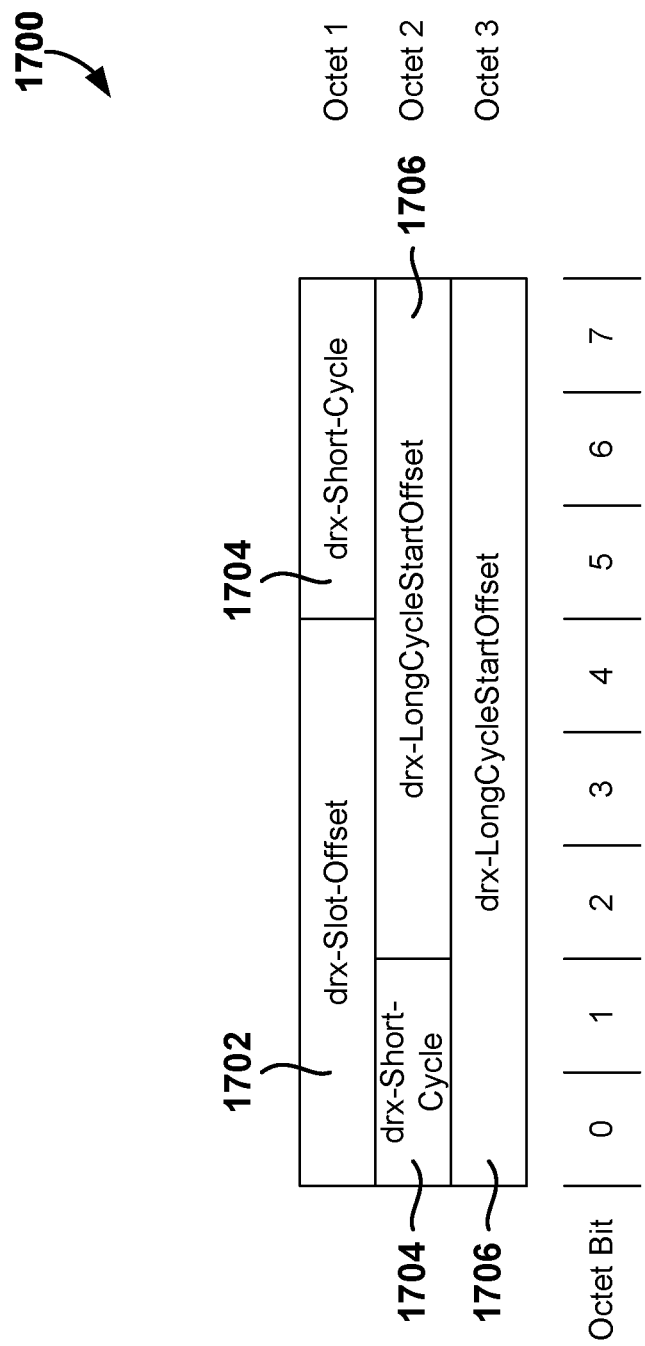
FIG. 17 illustrates an example of a medium access control control element (MAC-CE) format for carrying the radio access (e.g., Uu) DRX configuration, in accordance with the present disclosure.

The disclosure relates in some aspects to using protocol Layer 2 (L2) signaling for signaling the assistance information of FIG. 16. For example, a MAC CE may convey the relevant Uu DRX configuration (e.g., drx-LongCycleStartOffset, drx-Short-Cycle, drx-SlotOffset). FIG. 17 illustrates an example of a MAC CE format 1700 for carrying the Uu DRX configuration. In some examples, the MAC-CE carries a drx-SlotOffset 1702, a drx-ShortCycle 1704, and a drx-LongCycleStart Offset 1706. In some examples, the ShortDRX information is optional, since for Uu the short DRX cycle is optional. The MAC CE may be designed with variable length in some examples. A BS (e.g., gNB) may also set a subset of values for the update (e.g., drx-SlotOffset has 32 values, and the gNB may inform UEs that the updated value in the MAC CE is only one of 18 values in a subset).

The disclosure relates in some aspects to using protocol Layer 1 (L1) and Layer 2 (L2) signaling for signaling the assistance information of FIG. 16. For example, RRC signaling may configure a set of values for drx-LongCycleStartOffset, shortDRX, drx-SlotOffset, and L1/L2 signaling may be used to point to one of the values of the set. Here, a pointer to the list may be sent to minimize the overhead (e.g., the L1/L2 signaling may carry an index/pointer value such as 0, 1, 2, etc.). This signaling of assistance information may be used in 1 of FIG. 16 (Rx UE to Tx UE) and/or 2 of FIG. 16 (Tx UE to Tx UE's gNB).

The assistance information may also contain other information (e.g., which helps the Tx UE's gNB in setting the SL DRX for the Rx UE). In some examples, this information may be at least one preferred SL DRX configuration as specified by the Rx UE and/or the Rx UE's gNB. In some examples, this information may be at least one existing SL DRX configuration (e.g., that the Rx UE received from other Tx UEs).

The disclosure relates in some aspects to using protocol Layer 3 (L3) signaling for signaling the SL DRX configuration of FIG. 16 (e.g., sl-drx-StartOffset, sl-drx-Cycle, sl-drx-SlotOffset). For example, an RRC message may contain the SL DRX configuration. In some examples, the RRC message may contain the whole SL DRX configuration (e.g., a conventional Sl-DRX-Config as shown in Table 3). In some examples, the RRC message may contain a subset of the SL DRX configuration which is related to alignment (e.g., a new Sl-DRX-Config-Alignment as shown in Table 4).

TABLE 3

```
Sl-DRX-Config ::= SEQUENCE {
    sl-drx-onDurationTimer,
    sl-drx-InactivityTimer,
    sl-drx-HARQ-RTT-Timer,
    sl-drx-RetransmissionTimer,
    sl-drx-StartOffset,
    sl-drx-SlotOffset
    sl-drx-Cycle
}
```

TABLE 4

```
Sl-DRX-Config-Alignment ::= SEQUENCE {
    sl-drx-StartOffset,
    sl-drx-SlotOffset
    sl-drx-Cycle
}
```

Figure 18:
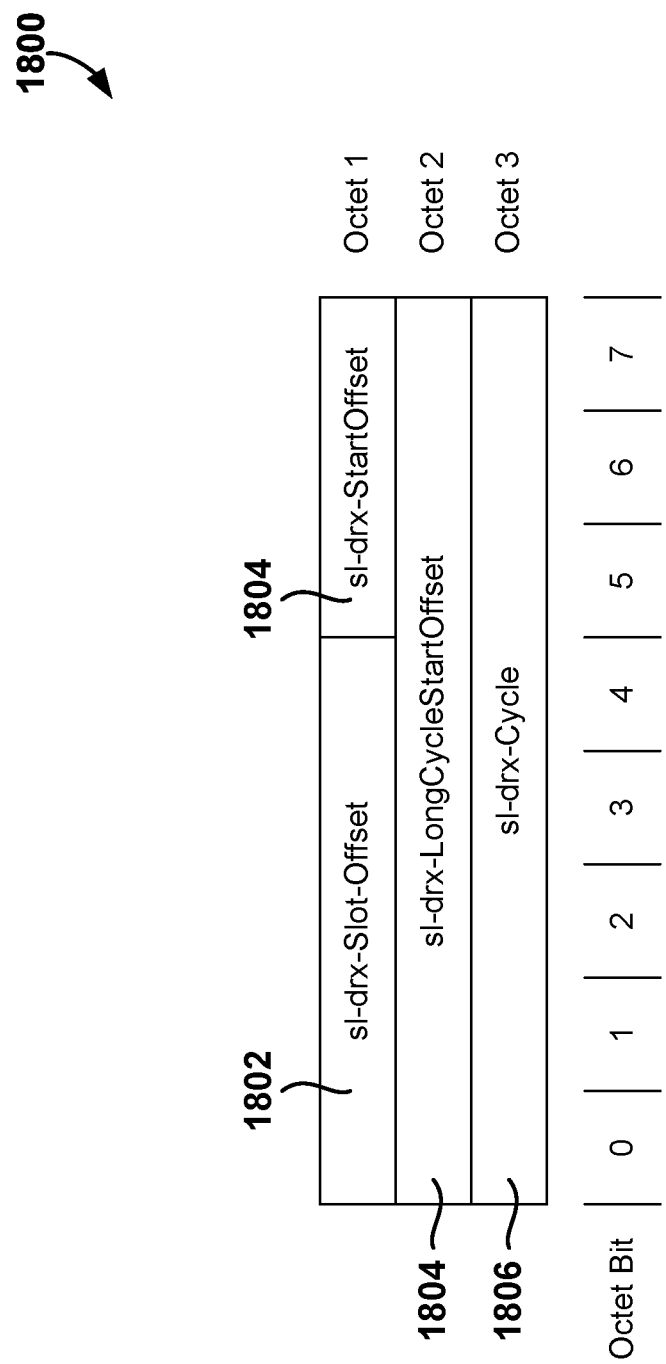
FIG. 18 illustrates an example of a MAC-CE format for carrying the Uu DRX configuration, in accordance with the present disclosure.

The disclosure relates in some aspects to using protocol Layer 2 (L2) signaling for signaling the SL DRX configuration of FIG. 16. For example, a MAC CE may convey the relevant Uu DRX configuration (e.g., sl-drx-StartOffset, sl-drx-Cycle, sl-drx-SlotOffset). FIG. 18 illustrates an example of a MAC CE format 1800 for carrying the Ue DRX configuration. In some examples, the MAC-CE carries an sl-drx-SlotOffset 1802, an sl-drx-SlotOffset 1804, and an sl-drx-Cycle 1806. The MAC CE may be designed with variable length in some examples. A BS (e.g., gNB) may also set a subset of values for the update (e.g., sl-drx-SlotOffset has 32 values, and the gNB may inform UEs that the updated value in the MAC CE is only one of 18 values in a subset).

The disclosure relates in some aspects to using protocol Layer 1 (L1) and Layer 2 (L2) signaling for signaling the SL DRX of FIG. 16. For example, an RRC message may configure a set of values for sl-drx-StartOffset, sl-drx-SlotOffset, and sl-drx-Cycle, and L1/L2 signaling may be used to point to one of the values of the set. Here, a pointer to the list may be sent to minimize the overhead (e.g., the L1/L2 signaling may carry an index/pointer value such as 0, 1, 2, etc.). This signaling of assistance information may be used in 3 of FIG. 16 (Tx UE's gNB to Tx UE) and/or 4 of FIG. 16 (Tx UE to Rx UE) and/or 5 of FIG. 16 (Rx UE to Rx UE's gNB).

The following provides an overview of some Aspects of the present disclosure:

Aspect 1: A method of wireless communication performed by a first user equipment (UE), comprising: transmitting, to a second UE associated with a sidelink connection with the first UE, assistance information indicating at least part of a first discontinuous reception (DRX) configuration for a radio access link between the first UE and a base station; receiving, from the second UE, at least part of a sidelink DRX configuration for the sidelink connection, wherein an on duration of the sidelink DRX configuration is not aligned with an on duration of the first DRX configuration; transmitting, to the base station, information indicating at least part of the sidelink DRX configuration; receiving, from the base station, a second DRX configuration for the radio access link; and communicating in accordance with the sidelink DRX configuration or the second DRX configuration.

Aspect 2: The method of Aspect 1, wherein the second DRX configuration has one or more parameters that are modified relative to the first DRX configuration including at least one of: a DRX slot offset, a DRX start offset, a DRX short cycle, or a DRX long cycle start offset.

Aspect 3: The method of any of Aspects 1-2, wherein the assistance information is provided via a radio resource control (RRC) message.

Aspect 4: The method of Aspect 3, wherein the RRC message includes an entirety of the first DRX configuration.

Aspect 5: The method of Aspect 3, wherein the RRC message includes a subset of the first DRX configuration.

Aspect 6: The method of any of Aspects 1-5, wherein the assistance information is provided via a medium access control (MAC) message.

Aspect 7: The method of Aspect 6, wherein the MAC message includes one or more parameters of the first DRX configuration that can be modified in the second DRX configuration.

Aspect 8: The method of Aspect 6, wherein one or more fields of the MAC message have a variable length.

Aspect 9: The method of Aspect 6, wherein the MAC message indicates a selected parameter from a set of configured parameters for the first DRX configuration.

Aspect 10: The method of any of Aspects 1-9, wherein the assistance information indicates a selected parameter from a set of configured parameters for the first DRX configuration via physical layer signaling.

Aspect 11: The method of any of Aspects 1-10, wherein the assistance information includes at least one of: information indicating a preferred sidelink DRX configuration, or information indicating a sidelink DRX configuration between the first UE and another UE other than the second UE.

Aspect 12: The method of any of Aspects 1-11, wherein the information indicating at least part of the sidelink DRX configuration is received via a radio resource control (RRC) message.

Aspect 13: The method of Aspect 12, wherein the RRC message includes an entirety of the sidelink DRX configuration.

Aspect 14: The method of Aspect 12, wherein the RRC message includes a subset of the sidelink DRX configuration.

Aspect 15: The method of any of Aspects 1-14, wherein the information indicating at least part of the sidelink DRX configuration is provided via a medium access control (MAC) message.

Aspect 16: The method of Aspect 15, wherein the MAC message includes one or more parameters of the sidelink DRX configuration used to determine the second DRX configuration.

Aspect 17: The method of Aspect 15, wherein the MAC message has a variable length.

Aspect 18: The method of Aspect 15, wherein the MAC message indicates a selected parameter from a set of configured parameters for the sidelink DRX configuration.

Aspect 19: The method of any of Aspects 1-18, wherein the information indicating at least part of the sidelink DRX configuration indicates, via physical layer signaling, a selected parameter from a set of configured parameters for the sidelink DRX configuration.

Aspect 20: The method of any of Aspects 1-19, wherein the second DRX configuration is received via a radio resource control (RRC) message.

Aspect 21: The method of Aspect 20, wherein the RRC message includes an entirety of the second DRX configuration.

Aspect 22: The method of Aspect 20, wherein the RRC message includes a subset of the second DRX configuration.

Aspect 23: The method of any of Aspects 1-22, wherein the second DRX configuration is received via a medium access control (MAC) message.

Aspect 24: The method of Aspect 23, wherein the MAC message includes one or more updated parameters of the second DRX configuration.

Aspect 25: The method of Aspect 23, wherein the MAC message has a variable length.

Aspect 26: The method of Aspect 23, wherein the MAC message indicates a selected parameter from a set of configured parameters for the second DRX configuration.

Aspect 27: The method of any of Aspects 1-26, wherein the reception of the second DRX configuration further comprises: receiving, via physical layer signaling, an indication of a selected parameter from a set of configured parameters for the second DRX configuration.

Aspect 28: A method of wireless communication performed by a base station, comprising: transmitting, to a first user equipment (UE), information indicating a first discontinuous reception (DRX) configuration for a radio access link between the first UE and the base station; receiving, from the first UE, information indicating at least part of a sidelink DRX configuration between the first UE and a second UE, wherein an on duration of the sidelink DRX configuration is not aligned with an on duration of the first DRX configuration; identifying a second DRX configuration for the radio access link, wherein an on duration of the second DRX configuration is aligned with an on duration of the sidelink DRX configuration; and transmitting, to the first UE, information indicating the second DRX configuration.

Aspect 29: The method of Aspect 28, wherein the second DRX configuration has one or more parameters that are modified relative to the first DRX configuration including at least one of: a DRX slot offset, a DRX start offset, a DRX short cycle, or a DRX long cycle start offset.

Aspect 30: The method of any of Aspects 28-29, wherein the information indicating at least part of the sidelink DRX configuration is received via a radio resource control (RRC) message.

Aspect 31: The method of Aspect 30, wherein the RRC message includes an entirety of the sidelink DRX configuration.

Aspect 32: The method of Aspect 30, wherein the RRC message includes a subset of the sidelink DRX configuration.

Aspect 33: The method of any of Aspects 28-32, wherein the information indicating at least part of the sidelink DRX configuration is received via a medium access control (MAC) message.

Aspect 34: The method of Aspect 33, wherein the MAC message includes one or more parameters of the sidelink DRX configuration used to determine the second DRX configuration.

Aspect 35: The method of Aspect 33, wherein the MAC message has a variable length.

Aspect 36: The method of Aspect 33, wherein the MAC message indicates a selected parameter from a set of configured parameters for the sidelink DRX configuration.

Aspect 37: The method of any of Aspects 28-36, wherein the information indicating at least part of the sidelink DRX configuration indicates, via physical layer signaling, a selected parameter from a set of configured parameters for the sidelink DRX configuration.

Aspect 38: The method of any of Aspects 28-37, wherein the second DRX configuration is transmitted via a radio resource control (RRC) message.

Aspect 39: The method of Aspect 38, wherein the RRC message includes an entirety of the second DRX configuration.

Aspect 40: The method of Aspect 38, wherein the RRC message includes a subset of the second DRX configuration.

Aspect 41: The method of any of Aspects 28-40, wherein the second DRX configuration is transmitted via a medium access control (MAC) message.

Aspect 42: The method of Aspect 41, wherein the MAC message includes one or more updated parameters of the second DRX configuration.

Aspect 43: The method of Aspect 41, wherein the MAC message has a variable length.

Aspect 44: The method of Aspect 41, wherein the MAC message indicates a selected parameter from a set of configured parameters for the second DRX configuration.

Aspect 45: The method of any of Aspects 28-44, wherein transmitting the information indicating the second DRX configuration further comprises: transmitting, via physical layer signaling, an indication of a selected parameter from a set of configured parameters for the second DRX configuration.

Aspect 46: A method of wireless communication performed by a first user equipment (UE), comprising: receiving, from a network node, a first discontinuous reception (DRX) configuration for a radio access link between the first UE and the network node; receiving, from the second UE, at least part of a sidelink DRX configuration for the sidelink connection; transmitting, to the network node, information indicating at least part of the sidelink DRX configuration; and communicating in accordance with the sidelink DRX configuration or the first DRX configuration.

Aspect 47: The method of Aspect 1, further comprising transmitting, to a second UE associated with a sidelink connection with the first UE, assistance information.

Aspect 48: The method of Aspect 2, wherein the assistance information indicates at least part of the first DRX configuration for the radio access link between the first UE and the network node.

Aspect 49: The method of Aspect 3, wherein the assistance information is provided via a radio resource control (RRC) message.

Aspect 50: The method of Aspect 3, wherein the assistance information is provided via a medium access control (MAC) message.

Aspect 51: The method of Aspect 3, wherein the assistance information includes at least one of: information indicating a preferred sidelink DRX configuration, or information indicating a sidelink DRX configuration between the first UE and another UE other than the second UE.

Aspect 52: The method of Aspect 1, further comprising receiving, from the network node, a second DRX configuration for the radio access link, wherein the second DRX configuration has one or more parameters that are modified relative to the first DRX configuration including at least one of: a DRX slot offset, a DRX start offset, a DRX short cycle, or a DRX long cycle start offset.

Aspect 53: The method of Aspect 7, wherein the second DRX configuration is received via a radio resource control (RRC) message.

Aspect 54: The method of Aspect 8, wherein the RRC message includes an entirety of the second DRX configuration.

Aspect 55: The method of Aspect 8, wherein the RRC message includes a subset of the second DRX configuration.

Aspect 56: The method of Aspect 7, wherein an on duration of the second DRX configuration is aligned with an on duration of the sidelink DRX configuration.

Aspect 57: The method of Aspect 1, wherein the sidelink DRX configuration is based at least in part on the first DRX configuration.

Aspect 58: The method of Aspect 12, wherein an on duration of the sidelink DRX configuration is aligned with an on duration of the first DRX configuration.

Aspect 59: The method of Aspect 1, wherein the at least part of the sidelink DRX configuration is received via a radio resource control (RRC) message.

Aspect 60: The method of Aspect 14, wherein the RRC message includes an entirety of the sidelink DRX configuration.

Aspect 61: The method of Aspect 14, wherein the RRC message includes a subset of the sidelink DRX configuration.

Aspect 62: The method of Aspect 1, wherein the at least part of the sidelink DRX configuration indicates, via physical layer signaling, a selected parameter from a set of configured parameters for the sidelink DRX configuration.

Aspect 63: An apparatus for wireless communication at a device, comprising a processor; memory coupled with the processor; and instructions stored in the memory and executable by the processor to cause the apparatus to perform the method of one or more of Aspects 1-62.

Aspect 64: A device for wireless communication, comprising a memory and one or more processors coupled to the memory, the one or more processors configured to perform the method of one or more of Aspects 1-62.

Aspect 65: An apparatus for wireless communication, comprising at least one means for performing the method of one or more of Aspects 1-62.

Aspect 66: A non-transitory computer-readable medium storing code for wireless communication, the code comprising instructions executable by a processor to perform the method of one or more of Aspects 1-62.

Aspect 67: A non-transitory computer-readable medium storing a set of instructions for wireless communication, the set of instructions comprising one or more instructions that, when executed by one or more processors of a device, cause the device to perform the method of one or more of Aspects 1-62.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A first user equipment (UE) for wireless communication, comprising:
   one or more memories; and
   one or more processors, coupled to the one or more memories, configured to:
      receive, from a network node, a first discontinuous reception (DRX) configuration for a radio access link between the first UE and the network node;
      receive, from a second UE associated with a sidelink connection with the first UE, at least part of a sidelink DRX configuration for the sidelink connection;
      transmit, to the network node, information indicating at least part of the sidelink DRX configuration; and
      communicate in accordance with the sidelink DRX configuration or the first DRX configuration.

2. The first UE of claim 1, wherein the one or more processors are further configured to transmit, to the second UE, assistance information.

3. The first UE of claim 2, wherein the assistance information indicates at least part of the first DRX configuration for the radio access link between the first UE and the network node.

4. The first UE of claim 3, wherein the assistance information is provided via a radio resource control (RRC) message.

5. The first UE of claim 3, wherein the assistance information is provided via a medium access control (MAC) message.

6. The first UE of claim 3, wherein the assistance information includes at least one of:

information indicating a preferred sidelink DRX configuration, or information indicating a sidelink DRX configuration between the first UE and another UE other than the second UE.

7. The first UE of claim 1, wherein the one or more processors are further configured to receive, from the network node, a second DRX configuration for the radio access link, wherein the second DRX configuration has one or more parameters that are modified relative to the first DRX configuration including at least one of:
   a DRX slot offset,
   a DRX start offset,
   a DRX short cycle, or
   a DRX long cycle start offset.

8. The first UE of claim 7, wherein the second DRX configuration is received via a radio resource control (RRC) message.

9. The first UE of claim 8, wherein the RRC message includes an entirety of the second DRX configuration.

10. The first UE of claim 8, wherein the RRC message includes a subset of the second DRX configuration.

11. The first UE of claim 7, wherein an on duration of the second DRX configuration is aligned with an on duration of the sidelink DRX configuration.

12. The first UE of claim 1, wherein the sidelink DRX configuration is based at least in part on the first DRX configuration.

13. The first UE of claim 12, wherein an on duration of the sidelink DRX configuration is aligned with an on duration of the first DRX configuration.

14. The first UE of claim 1, wherein the at least part of the sidelink DRX configuration is received via a radio resource control (RRC) message.

15. The first UE of claim 14, wherein the RRC message includes an entirety of the sidelink DRX configuration.

16. The first UE of claim 14, wherein the RRC message includes a subset of the sidelink DRX configuration.

17. The first UE of claim 1, wherein the at least part of the sidelink DRX configuration indicates, via physical layer signaling, a selected parameter from a set of configured parameters for the sidelink DRX configuration.

18. A method of wireless communication performed by a first user equipment (UE), comprising:
   receiving, from a network node, a first discontinuous reception (DRX) configuration for a radio access link between the first UE and the network node;
   receiving, from a second UE associated with a sidelink connection with the first UE, at least part of a sidelink DRX configuration for the sidelink connection;
   transmitting, to the network node, information indicating at least part of the sidelink DRX configuration; and
   communicating in accordance with the sidelink DRX configuration or the first DRX configuration.

19. The method of claim 18, further comprising transmitting, to the second UE associated with a sidelink connection with the first UE, assistance information.

20. The method of claim 19, wherein the assistance information indicates at least part of the first DRX configuration for the radio access link between the first UE and the network node.

21. The method of claim 20, wherein the assistance information is provided via a radio resource control (RRC) message.

22. The method of claim 20, wherein the assistance information is provided via a medium access control (MAC) message.

23. The method of claim 20, wherein the assistance information includes at least one of:
   information indicating a preferred sidelink DRX configuration, or
   information indicating a sidelink DRX configuration between the first UE and another UE other than the second UE.

24. The method of claim 18, further comprising receiving, from the network node, a second DRX configuration for the radio access link, wherein the second DRX configuration has one or more parameters that are modified relative to the first DRX configuration including at least one of:
   a DRX slot offset,
   a DRX start offset,
   a DRX short cycle, or
   a DRX long cycle start offset.

25. A non-transitory computer-readable medium storing a set of instructions for wireless communication, the set of instructions comprising:
   one or more instructions that, when executed by one or more processors of a first user equipment (UE), cause the UE to:
      receive, from a network node, a first discontinuous reception (DRX) configuration for a radio access link between the first UE and the network node;
      receive, from a second UE associated with a sidelink connection with the first UE, at least part of a sidelink DRX configuration for the sidelink connection;
      transmit, to the network node, information indicating at least part of the sidelink DRX configuration; and
      communicate in accordance with the sidelink DRX configuration or the first DRX configuration.

26. The non-transitory computer-readable medium of claim 25, wherein the one or more instructions further cause the UE to transmit, to a second UE associated with a sidelink connection with the first UE, assistance information.

27. The non-transitory computer-readable medium of claim 26, wherein the assistance information indicates at least part of the first DRX configuration for the radio access link between the first UE and the network node.

28. An apparatus for wireless communication, comprising:
   means for receiving, from a network node, a first discontinuous reception (DRX) configuration for a radio access link between the apparatus and the network node;
   means for receiving, from a second user equipment (UE) associated with a sidelink connection with the apparatus, at least part of a sidelink DRX configuration for the sidelink connection;
   means for transmitting, to the network node, information indicating at least part of the sidelink DRX configuration; and
   means for communicating in accordance with the sidelink DRX configuration or the first DRX configuration.

29. The apparatus of claim 28, further comprising means for transmitting, to a second UE associated with a sidelink connection with the apparatus, assistance information.

30. The apparatus of claim 29, wherein the assistance information indicates at least part of the first DRX configuration for the radio access link between the apparatus and the network node.

* * * * *